(12) United States Patent
Flitsch

(10) Patent No.: US 11,011,396 B2
(45) Date of Patent: May 18, 2021

(54) CUSTOMIZED SMART DEVICES AND TOUCHSCREEN DEVICES AND CLEANSPACE MANUFACTURING METHODS TO MAKE THEM

(71) Applicant: Frederick A. Flitsch, New Windsor, NY (US)

(72) Inventor: Frederick A. Flitsch, New Windsor, NY (US)

( * ) Notice: Subject to any disclaimer, the term of this patent is extended or adjusted under 35 U.S.C. 154(b) by 606 days.

(21) Appl. No.: 15/901,654

(22) Filed: Feb. 21, 2018

(65) Prior Publication Data

US 2018/0240691 A1    Aug. 23, 2018

Related U.S. Application Data

(63) Continuation-in-part of application No. 15/754,202, filed as application No. PCT/US2017/049630 on
(Continued)

(51) Int. Cl.
*H01L 21/00* (2006.01)
*H01L 21/67* (2006.01)
(Continued)

(52) U.S. Cl.
CPC ........ *H01L 21/67161* (2013.01); *G06F 21/87* (2013.01); *H01L 21/0274* (2013.01); *H01L 21/268* (2013.01); *H01L 21/32051* (2013.01); *H01L 21/56* (2013.01); *H01L 21/67253* (2013.01); *H01L 21/67276* (2013.01);
(Continued)

(58) Field of Classification Search
CPC ..... G06F 21/87; H01L 21/0274; H01L 21/68; H01L 21/32051; H01L 21/56; H01L 21/67253; H01L 21/67276; H01L 21/67288; H01L 21/67706; H01L 21/67727; H01L 21/76802; H01L 21/76895; H01L 23/53276; H01L 23/573; H01L 25/0657; H01L 25/50; H05K 1/0286; H05K 1/029; H05K 3/303; H05K 3/0495

See application file for complete search history.

(56) References Cited

U.S. PATENT DOCUMENTS 6,047,068 A    4/2000  Rhelimi et al.
2001/0033012 A1  10/2001  Koemmerling et al.
(Continued)

FOREIGN PATENT DOCUMENTS

CN    103582184 A    2/2014
WO    2015043439 A1    4/2015

*Primary Examiner* — Richard A Booth

(57) ABSTRACT

The present invention provides various aspects for processing multiple types of substrates within cleanspace fabricators or for processing multiple or single types of substrates in multiple types of cleanspace environments. In some embodiments, a collocated composite cleanspace fabricator may be capable of processing semiconductor devices into integrated circuits and then performing assembly operations to result in product in packaged form. Customized smart devices, smart phones and touchscreen devices may be fabricated in examples of a cleanspace fabricator. In some examples, the smart devices, smart phones and touchscreen devices may have two touchscreens on opposite sides of the device along with hardware based encryption.

8 Claims, 17 Drawing Sheets

Related U.S. Application Data

Aug. 31, 2017, now Pat. No. 10,395,064, application No. 15/901,654, which is a continuation-in-part of application No. 15/241,419, filed on Aug. 19, 2016, now Pat. No. 10,651,063, which is a continuation-in-part of application No. 13/829,212, filed on Mar. 14, 2013, now abandoned, application No. 15/901,654, which is a continuation-in-part of application No. 13/734,991, filed on Jan. 6, 2013, now abandoned, application No. 15/901,654, which is a continuation-in-part of application No. 13/734,963, filed on Jan. 5, 2013, now abandoned.

(60) Provisional application No. 62/383,218, filed on Sep. 2, 2016.

(51) Int. Cl.

| | |
|---|---|
| *H01L 21/027* | (2006.01) |
| *H01L 21/768* | (2006.01) |
| *H01L 21/268* | (2006.01) |
| *H01L 23/532* | (2006.01) |
| *H01L 21/56* | (2006.01) |
| *H05K 3/30* | (2006.01) |
| *H01L 25/00* | (2006.01) |
| *H01L 25/065* | (2006.01) |
| *H05K 13/04* | (2006.01) |
| *H01L 21/677* | (2006.01) |
| *H01L 21/3205* | (2006.01) |
| *H05K 1/02* | (2006.01) |
| *H01L 23/00* | (2006.01) |
| *G06F 21/87* | (2013.01) |
| *H01M 10/04* | (2006.01) |
| *H01L 21/3065* | (2006.01) |
| *G06F 3/041* | (2006.01) |
| *H01M 8/02* | (2016.01) |
| *H05K 1/18* | (2006.01) |

(52) U.S. Cl.
CPC .. *H01L 21/67288* (2013.01); *H01L 21/67706* (2013.01); *H01L 21/67727* (2013.01); *H01L 21/76802* (2013.01); *H01L 21/76895* (2013.01); *H01L 23/53276* (2013.01); *H01L 23/573* (2013.01); *H01L 25/0657* (2013.01); *H01L 25/50* (2013.01); *H05K 1/029* (2013.01); *H05K 1/0275* (2013.01); *H05K 1/0286* (2013.01); *H05K 3/303* (2013.01); *H05K 13/0495* (2013.01); *G06F 3/041* (2013.01); *G06F 2203/04103* (2013.01); *H01L 21/3065* (2013.01); *H01L 21/76898* (2013.01); *H01L 2225/06513* (2013.01); *H01L 2225/06517* (2013.01); *H01L 2225/06541* (2013.01); *H01M 8/02* (2013.01); *H01M 10/04* (2013.01); *H05K 1/0284* (2013.01); *H05K 1/181* (2013.01)

(56) References Cited

U.S. PATENT DOCUMENTS

2013/0226329 A1\* 8/2013 Flitsch .............. H01L 21/67017 700/112
2014/0189989 A1\* 7/2014 Flitsch .............. H01L 21/67178 29/25.01

\* cited by examiner

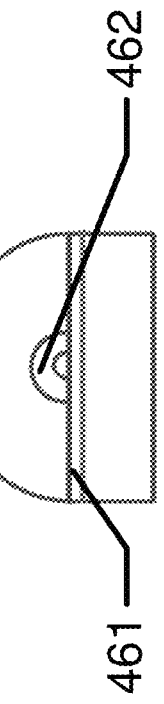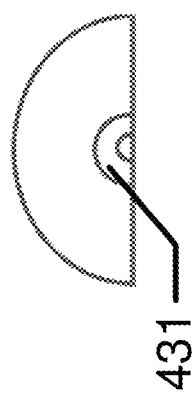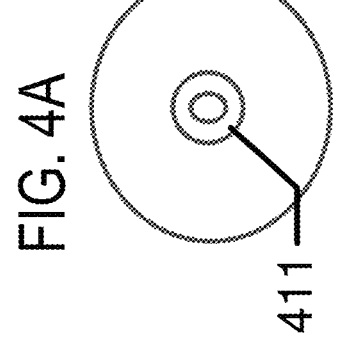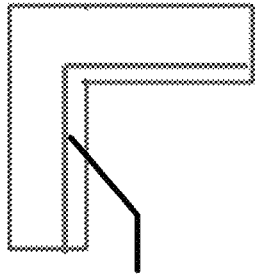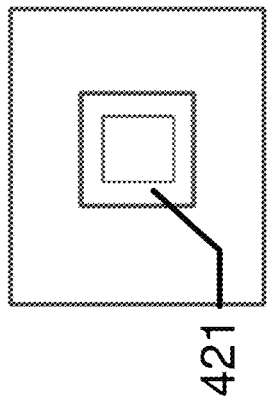
FIG. 4A FIG. 4B FIG. 4C FIG. 4D FIG. 4E FIG. 4F FIG. 4G FIG. 4H

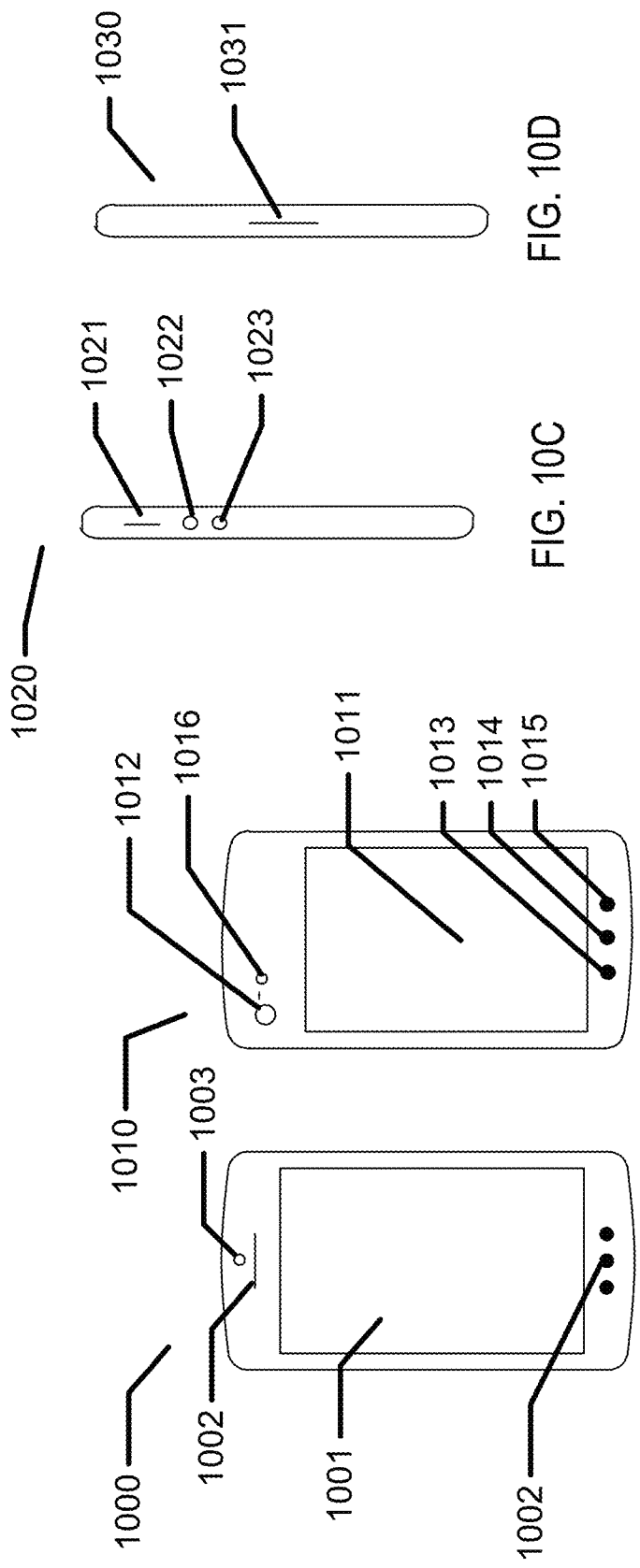

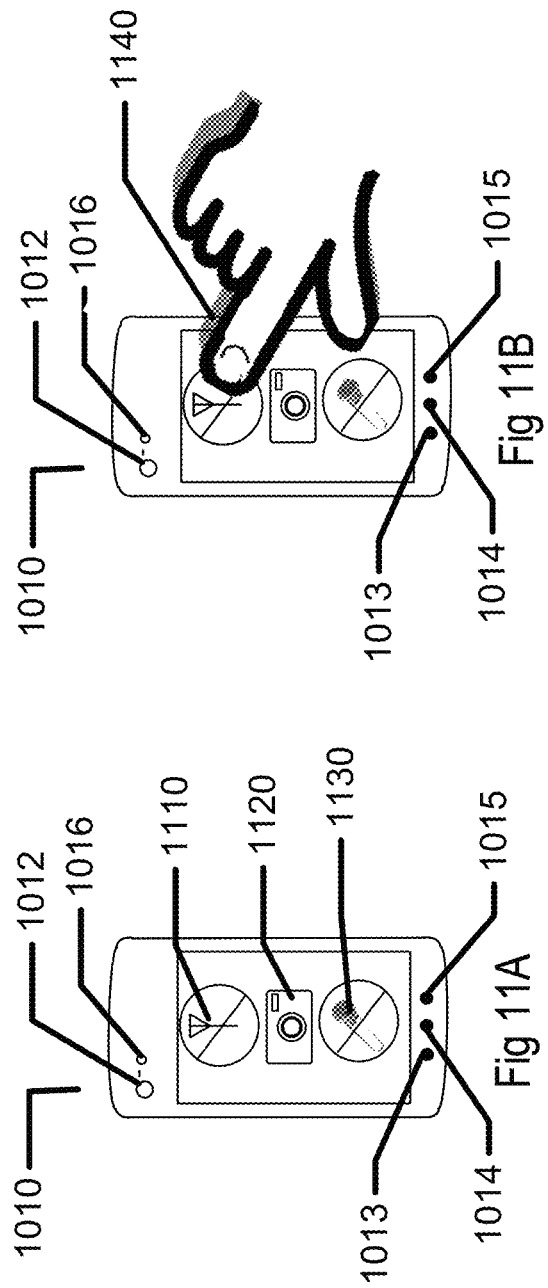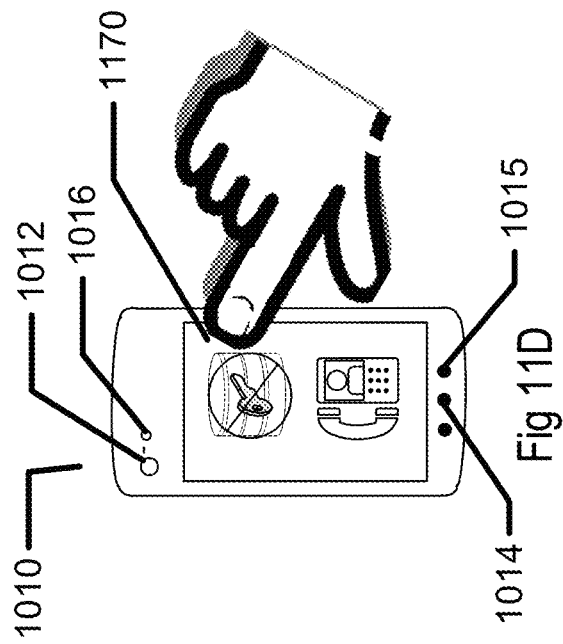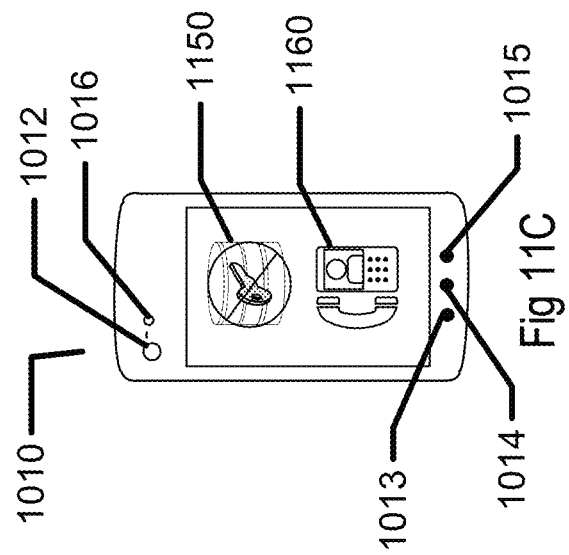

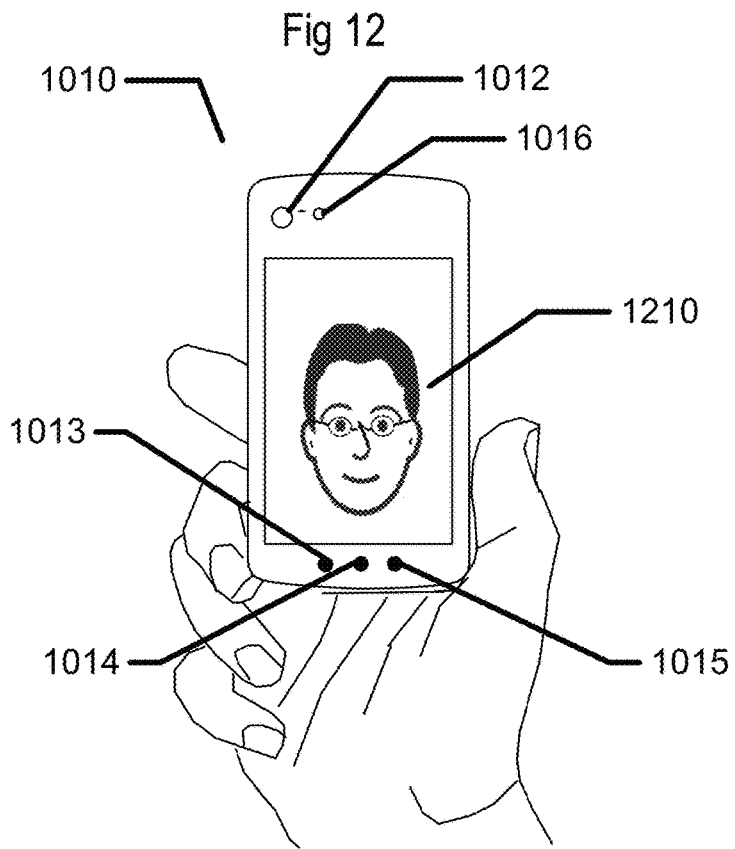
Fig 12
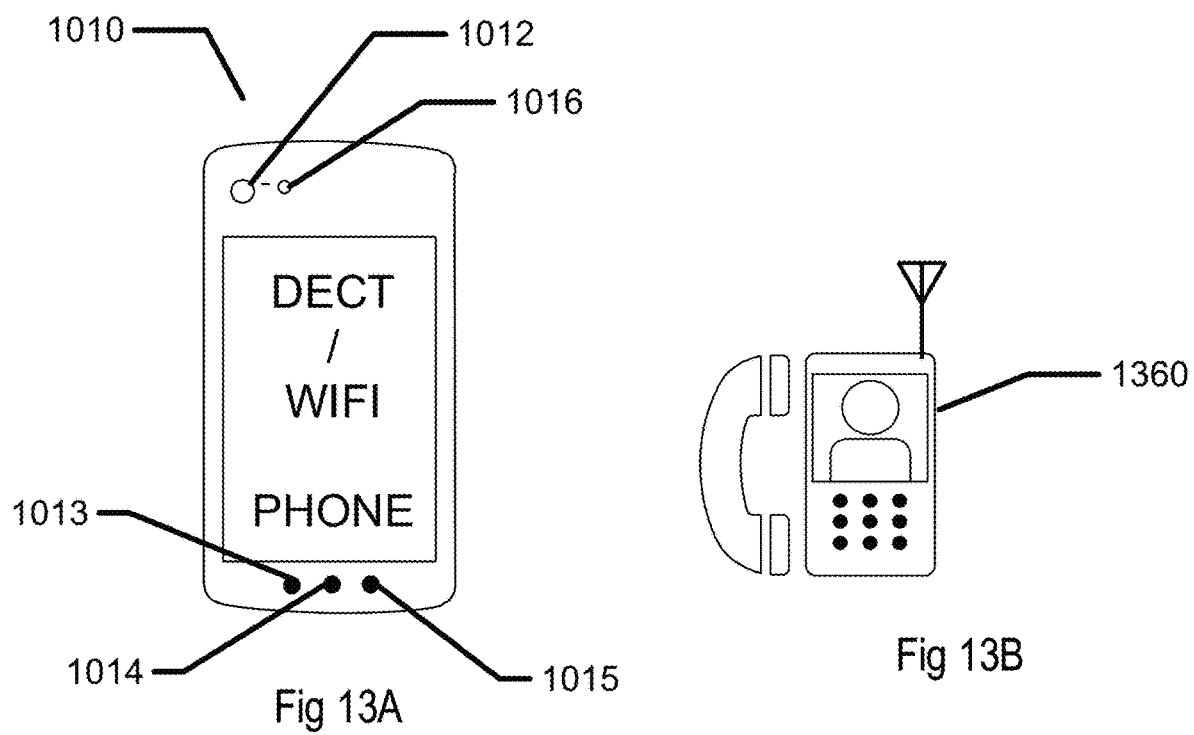
Fig 13A
Fig 13B

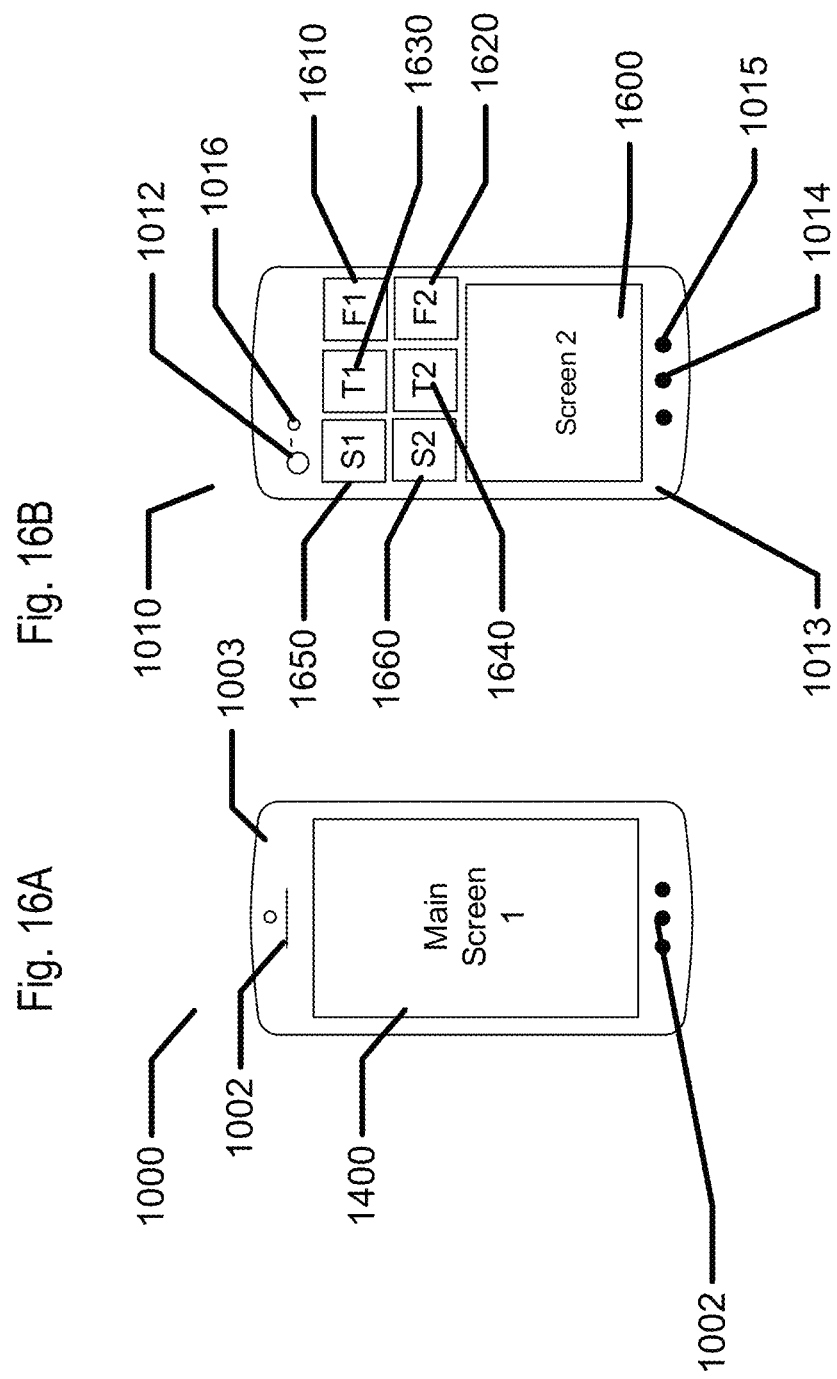

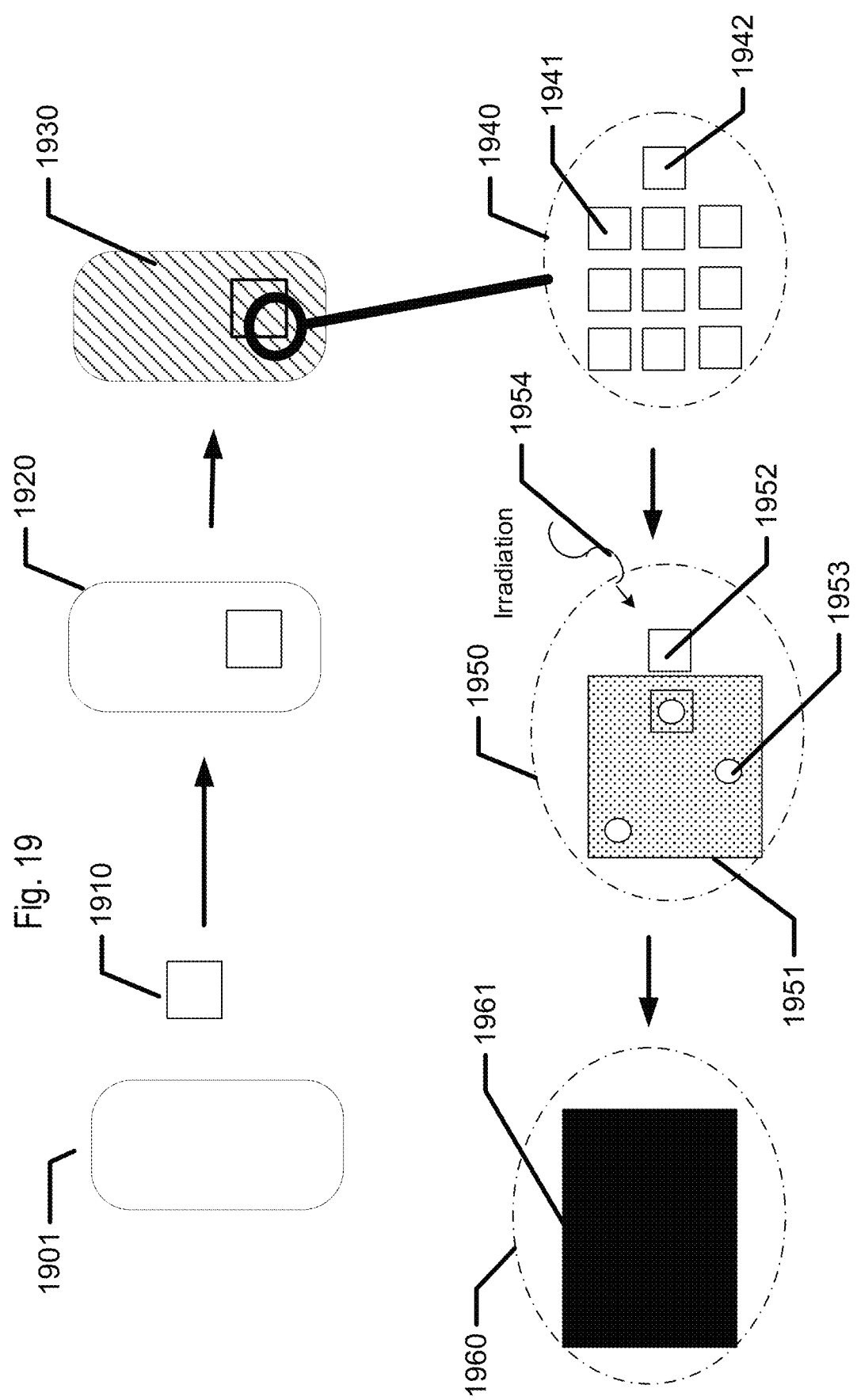

CUSTOMIZED SMART DEVICES AND TOUCHSCREEN DEVICES AND CLEANSPACE MANUFACTURING METHODS TO MAKE THEM

CROSS REFERENCE TO RELATED APPLICATIONS

This application is a continuation of application Ser. No. 15/754,202 file Feb. 21, 2018 which is the National Stage of International Application No. PCT/US2017/49630, filed Oct. 31, 2017, which claims the benefit of U.S. provisional Application 62/383,218 filed Sep. 2, 2016; and this application claims priority as a continuation in part to the U.S. patent application Ser. No. 15/241,419 filed Aug. 18, 2016 which in turn claims priority as a continuation in part to the U.S. patent application Ser. No. 13/829,212 filed Mar. 14, 2013; and this application claims priority as a continuation in part to the U.S. patent application Ser. No. 13/734,963 filed Jan. 5, 2013; and this application claims priority as a continuation in part to the U.S. application Ser. No. 13/734,991 filed Jan. 6, 2013. The contents of these heretofore mentioned applications are relied upon and hereby incorporated by reference.

FIELD OF THE INVENTION

The present invention relates to methods and apparatus that support prototyping and manufacturing of customized smart devices based upon the environment created by cleanspace fabricators. More specifically, the present invention relates to methods of utilizing fabricator designs which may be used to process high technology products and assemble them into a packaged form with a focus on the utilization of additive manufacturing techniques and 3D chip assembly techniques. Unique forms of smart devices and touchscreen devices which may be made with these techniques are also disclosed.

BACKGROUND OF THE INVENTION

A known approach to advanced technology fabrication of materials, such as semiconductor substrates, is to assemble a manufacturing facility as a "cleanroom." In such cleanrooms, processing tools are arranged to provide aisle space for human operators or automation equipment. Exemplary cleanroom design is described in: "Cleanroom Design, Second Edition," edited by W. Whyte, published by John Wiley & Sons, 1999, ISBN 0-471-94204-9, (herein after referred to as "the Whyte text").

Cleanroom design has evolved over time from an initial starting point of locating processing stations within clean hoods. Vertical unidirectional airflow can be directed through a raised floor, with separate cores for the tools and aisles. It is also known to have specialized mini-environments which surround only a processing tool for added space cleanliness. Another known approach includes the "ballroom" approach, wherein tools, operators and automation all reside in the same cleanroom.

Evolutionary improvements have enabled higher yields and the production of devices with smaller geometries. However, known cleanroom design has disadvantages and limitations.

For example, as the size of tools has increased and the dimensions of cleanrooms have increased, the volume of cleanspace that is controlled has concomitantly increased. As a result, the cost of building the cleanspace, and the cost of maintaining the cleanliness of such cleanspace, has increased considerably. Not all processing steps, like for example the steps used to assembly products into their packaging, need to occur in the developing large processing environments.

Additionally, the processing of high technology products may typically be split into portions that require high levels of cleanliness in the manufacturing environment which are typically at the beginning of the processing and then steps like the assembly steps which have less critical contamination sensitive processing. In some cases, these two types of processing steps may be processed in different facilities because of their different needs. Yet, in many small volume activities, the need for rapid processing of all steps to result in a product that can be utilized in its fully processed form may be important. It would therefore be useful to have an efficient processing fabricator design that can process the different types of steps of multiple cleanliness requirements in a single location with rapidity.

It would be desirable to advance procedures and equipment for the assembling of electronics based products in cleanspace facilities that may be used to fabricate mechanical enclosure, cases, and device bodies for smart devices and touchscreen devices. It would also be desirable that the resulting devices may be customized for user preference and manufactured and offered for sales in novel environments and locations.

SUMMARY OF THE INVENTION

Accordingly, building on the types of environments defined in previous patents related to cleanspace environments, there are novel methods to utilize cleanspace fabricators for the purposes of both prototyping and manufacturing and developing customized smart devices and touchscreen devices. Some of the processing steps may occur with substrates that are in a wafer form; while other steps may occur in substrates which are cut outs from that wafer form. Other substrates may relate to the processing of other types of components that may be married with semiconductor components such as for example displays and energization elements.

Accordingly, the present invention provides description of how to define methods and apparatus of utilizing cleanspace fabricator environments capable of processing high technology products from initial wafer substrate form to final packaging into products that are complete prototypes and marketed goods. The utilization of additive manufacturing techniques and three-dimensional chip packaging (hereafter referred to as 3DIC) techniques provide novel applications. Moreover, the products that may be fabricated in the unique environment may provide novel devices in their own right. The ability to process in cleanspace environments or a single cleanspace environment in one location may dramatically alter the form factor on components assembled into product goods. For example, when ICs are placed directly from a testing environment into products without shipping, the ICs may be placed as singulated dice or pieces that are not covered in packaging. The work flows may save on packaging costs, testing costs and allow for much quicker turn around cycles and more unique product definitions.

The techniques described herein may be useful in numerous methods. A method may be useful to create products which are combinations of one of more of integrated circuits, energization elements, display components, sensors, interconnection elements, fuel cells, batteries, discrete electrical switches or connectors, and supporting cases or structure. In some embodiments, a method may comprise introducing a semiconductor substrate into a cleanspace fabricator where the fabricator comprises at least a first matrix of processing tools. There may be at least two tools comprising a tool body and a tool port each, where one of them is oriented vertically above or below the other at least in part. The processing tools may have at least a portion of their body or port located or interfacing with a fabricator cleanspace. Said cleanspace may comprise a first boundary and a second boundary where each of the processing tools is capable of independent operation and removable in a discrete fashion relative to other processing tools. In some embodiments, the processing may also include processing on glass substrates. In some cases, the glass substrates may be in a predominately rectangular shape. In some embodiments, the glass substrate may be at least part of a touch screen display. The touch screen display may be formed completely with processing that occurs within the cleanspace fabricator or fabricators or in some cases some discrete components such as switches, connectors, memory devices, batteries or fuel cell components may be added into the cleanspace environment in produced form to be further processed into the product in the cleanspace fabricator. Some of these components, such as for example fuel cells may have some or all of their structure formed within a cleanspace fabricator environment.

The glass substrate may be useful in some embodiments to define a substrate upon which substantially all components are eventually added. The glass substrate may be one of numerous substrates that are processed in the cleanspace fabricator environment, where components are created by processing on the non-glass substrates and then added upon the glass substrate.

In some embodiments, where all or substantially all of components within a product are created with cleanspace fabricators, the product may be designed and electronic models may be passed to the cleanspace fabricator. The resulting product may represent the realization of the electrical design data in a physical form where semiconductor processing steps transform electrical data into functioning circuits and interconnect structures and additive manufacturing steps create structure, encapsulation and surrounding material, which in some cases may have a designed appearance in manners controllable within the fabricator environment. These methods may involve semiconductor substrates being processed in the type of cleanspace environments previously mention, along with glass substrates in the similar or same environment. Interconnect layers may be defined upon the glass substrate with processing steps within the cleanspace fabricator environment, or upon interconnect layers or features that are provided to the working environment of the cleanspace fabricator such as flexible substrates. Electronic circuits fabricated in the cleanspace environment may be attached to the interconnect layers while within the cleanspace environment, and additive manufacturing steps may be performed to encapsulate the various components and create structure of the resulting product. The result may be a prototype for a product or a marketable product as well.

In some examples, a product comprises two touch screens. The first touchscreen may be located antipodally to the second touchscreen so that an essentially two-sided smart device is created. The smart device may be a smart phone. The smart phone may have a separate cellular and WIFI phone capability. Each of the cellular and WIFI phone capability may interface with a different touchscreen display. In some examples, the phone may comprise a cellular capability and a DECT phone capability. In some examples, the smart phone comprises two cellular communication accounts, wherein the first cellular communication account is displayed on the first touchscreen while the second cellular communication account is displayed on the second touchscreen.

In some other examples, the smart device with two touchscreens may include examples wherein the second touchscreen interfaces with a function that physically connects and disconnects one or more of the smart device antenna, the smart device cameras and the smart device microphones. In some examples, the smart device may comprise a second touchscreen which interfaces with an encryption capability that interfaces with the electronics and storage elements that interface with the first touchscreen. The encryption capability may encrypt data as it is received through cellular transceivers of the smart device. In some other examples, the encryption capability encrypts data stored in flash memory of the device.

In some examples, a two-sided smart phone device may comprise the ability to display the rear facing camera of a standard smart phone on the second touchscreen display.

There may be methods that produce a customized smart device. In some examples the method may include the steps of obtaining a cleanspace fabrication system; installing the cleanspace fabrication system in a multi-floor storefront; soliciting desired customization options from a user; producing a case capable of holding first and second touchscreen device; installing electronics to interface and drive the first touchscreen; installing electronics to interface and drive the second touchscreen; installing a baseband integrated circuit within the smart device; and installing the first and second touchscreen in the case, wherein the first touchscreen is on a first large surface and the second touchscreen is on a second large surface and wherein the first large surface is antipodal to the second large surface. One general aspect includes an encryption protocol protected communications system including: a first smart device including: a first display screen, including a touchscreen; a first wireless communication circuit, where the first wireless communication circuit communicates digital data into and out of the first smart device; a first memory circuit of the first smart device; a first processor, where the first processor performs processing steps of application software of the first smart device stored within the first memory circuit, where the processing steps of application software display at least a first display message on the first display screen; a first hardware encryption device including: a second memory circuit, including a data storage function with a write capability, where data values stored within the second memory circuit are written during an assembly process of the hardware encryption device into the first smart device as a series of encryption codes; a second processor, where the processor receives an input data value at a data bus connected to the processor, and where the processor performs an encryption algorithm utilizing data values of the second memory circuit; and a first physically measurable device, where the first physically measurable device is contained within encapsulating layers of the first hardware encryption device, and where at least a first measurement of the physically measurable device is utilized in generating the encrypted data value.

One general aspect includes a method of forming a smart device with hardware based encryption including: forming a main circuit board of the smart device including a memory circuit, a processing unit, and a communication circuit; adding to the main circuit board a hardware encryption integrated circuit, where the hardware encryption integrated circuit has at least a first connection pad and a second connection pad on its external packaging to connect to circuit traces of a physically measurable device; depositing a first conductive film, where the first conductive film is a portion of a stack of encapsulating films which encapsulate at least the hardware encryption integrated circuit; imaging a pattern of interconnect pathways and connection pads into the first conductive film using photolithography and a photoresist system; etching the pattern of interconnect pathways and connection pads into the first conductive film based on the imaged pattern; removing residual photoresist; placing a film upon the connection pads, where the film has a characteristic that can be measured electrically at the connection pads, and where the characteristic may be modulated by selective processing of the film; modulating a physical characteristic of the film with a laser irradiation process; and depositing a second conductive film upon the film, where a connection pad outside the film electrically connects the second conductive film to the second electrical connection pad of the hardware encryption integrated circuit. Other embodiments of this aspect include corresponding computer systems, apparatus, and computer programs recorded on one or more computer storage devices, each configured to perform the actions of the methods.

Implementations may include the method where a resistance of at least a first portion of the network of connection pads is known to be accurate to two degrees of precision, and where a resistance value truncated to the two degrees of precision is used as a portion of an encryption code of the hardware encryption integrated circuit. The smart device where a second paired hardware encryption device is located at a telecommunications provider.

One general aspect includes a method of producing a customized smart device including: obtaining a cleanspace fabrication system; installing the cleanspace fabrication system in a multi-floor storefront; soliciting desired customization options from a user; producing a case capable of holding a first touchscreen device; installing electronics to interface and drive the first touchscreen; installing a baseband integrated circuit within the smart device; installing a hardware encryption device within the smart device; writing customized encryption codes into a memory circuit of the hardware encryption device; and encapsulating the hardware encryption device with a multilayer encapsulation stack, where a plurality of physically measurable devices are included in the encapsulation stack and electrically connected to the hardware encryption device, where removing the encapsulation stack to gain access to the hardware encryption device would alter at least a first physical measurement from the physically measurable devices, and where the first physical measurement is used by the hardware encryption device in determining an instant encryption code.

BRIEF DESCRIPTION OF THE DRAWINGS

The accompanying drawings, that are incorporated in and constitute a part of this specification, illustrate several embodiments of the invention and, together with the description, serve to explain the principles of the invention:

FIGS. 4A-4H illustrates exemplary general shapes of cleanspace fabricators with their cleanspaces for annular tubular examples, sections of annual tubular and combinations of various cleanspace fabricators with different cleanspace environments.

FIG. 10A-10F illustrate an exemplary two-sided smart phone device.

FIGS. 11A and 11B illustrate exemplary customized functions of a two-sided smart phone device.

FIGS. 11C and 11D illustrate additional exemplary customized functions of a two-sided smart phone device.

FIG. 12 illustrates an enhanced "selfie" capability enabled by a two-sided smart phone device.

FIGS. 13A and 13B illustrate a DECT or WIFI phone capability of a second side of a two-sided smart phone device.

FIGS. 16A and 16B illustrates customization with selectable capability enhancements to a standard two-sided smart phone device such as sensors, touchlets and functional enhancements.

FIG. 19 illustrates method steps for forming a hardware encryption device with physically measurable aspects.

DETAILED DESCRIPTION OF PREFERRED EMBODIMENTS

The present invention relates to methods and apparatus to create customized smart phone, smart device and touchscreen devices. In some examples, a collection of processing tools is assembled into a cleanspace fabricator with the capability of shaping structural cases and assembly supports, as well as capability to place and electrically connect various types and forms of devices such as touch screens, batteries, integrated circuits, circuit boards, flex boards and cables, switches, sensors, i/o connectors and the like. In some exemplary embodiments of this type of processing, substrates in the form of wafers may be processed either fully or at latter customization steps to create integrated circuits upon the substrate and then in subsequent processing the integrated circuits can be processed to result in a discrete integrated circuit that may be placed into the custom cases and assemblies fabricated in the fabrication environment. The fabrication environment may be a small cleanspace enabled facility that may fit into storefronts and locations of the type.

Cleanspace fabricators may come in numerous different types. Proceeding to FIGS. 1A-1D, a number of exemplary cleanspace fabricators are depicted. In item 110, a fabricator is depicted which is made up of numerous essentially planar cleanspace fabricators elements which are connected together. In item 120, a single standalone planar cleanspace is depicted. Item 130, depicts a round tubular annular cleanspace fabricator type. And, item 140 depicts a square exemplary tubular annular cleanspace fabricator type. It may be apparent that many different variations on these fundamental types of fabricators are included in the general art of cleanspace fabricators. In these versions of fabricators, a common mode of operations would be for the fabricators to process wafer form substrates of one type from when the substrates enter the fabricator to when they leave it. A different embodiment type of these fabricators may derive if there are multiple types of substrates that are simultaneously being processed in the fabricator.

Fabricators with Semiconductor Wafer Processing Cleanspace Elements and Semiconductor Die Packaging Cleanspace Elements.

Significant generality has been used in describing cleanspace fabricators because there are numerous types of technology fabrication that are consistent with the art including in an exemplary sense the processing of semiconductor substrates, Microelectromechanical systems, "Lab on Chip" processing, Biochip processing, and many other examples including the processing of substrates which support device production or are incorporated into devices as they are produced. Without losing the generality and purely for exemplary purposes, some examples that relate to the processing of semiconductor substrates will be used to illustrate the inventive art being described.

Figure 1B:
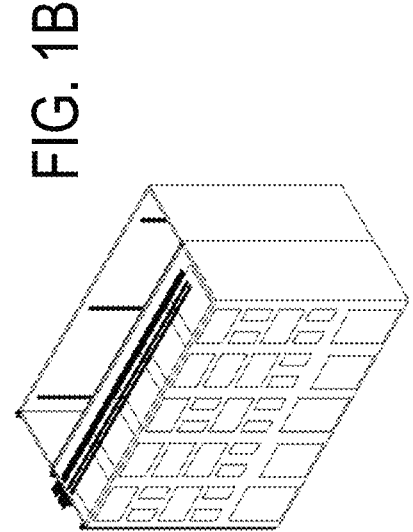
FIGS. 1A-1D illustrates some exemplary cleanspace fabricators
Figure 1D:
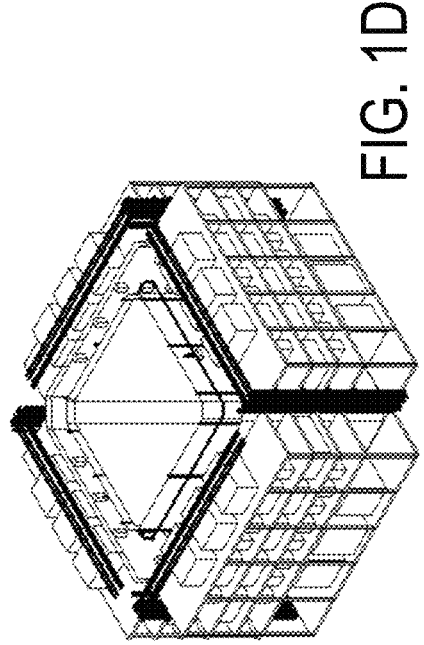
Figure 1A:
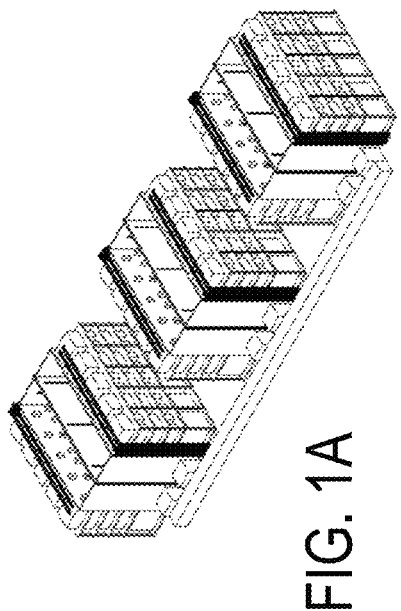
Figure 1C:
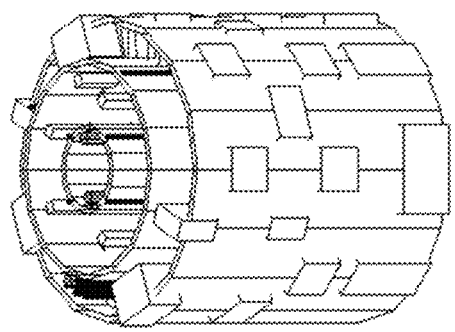
Figure 2:
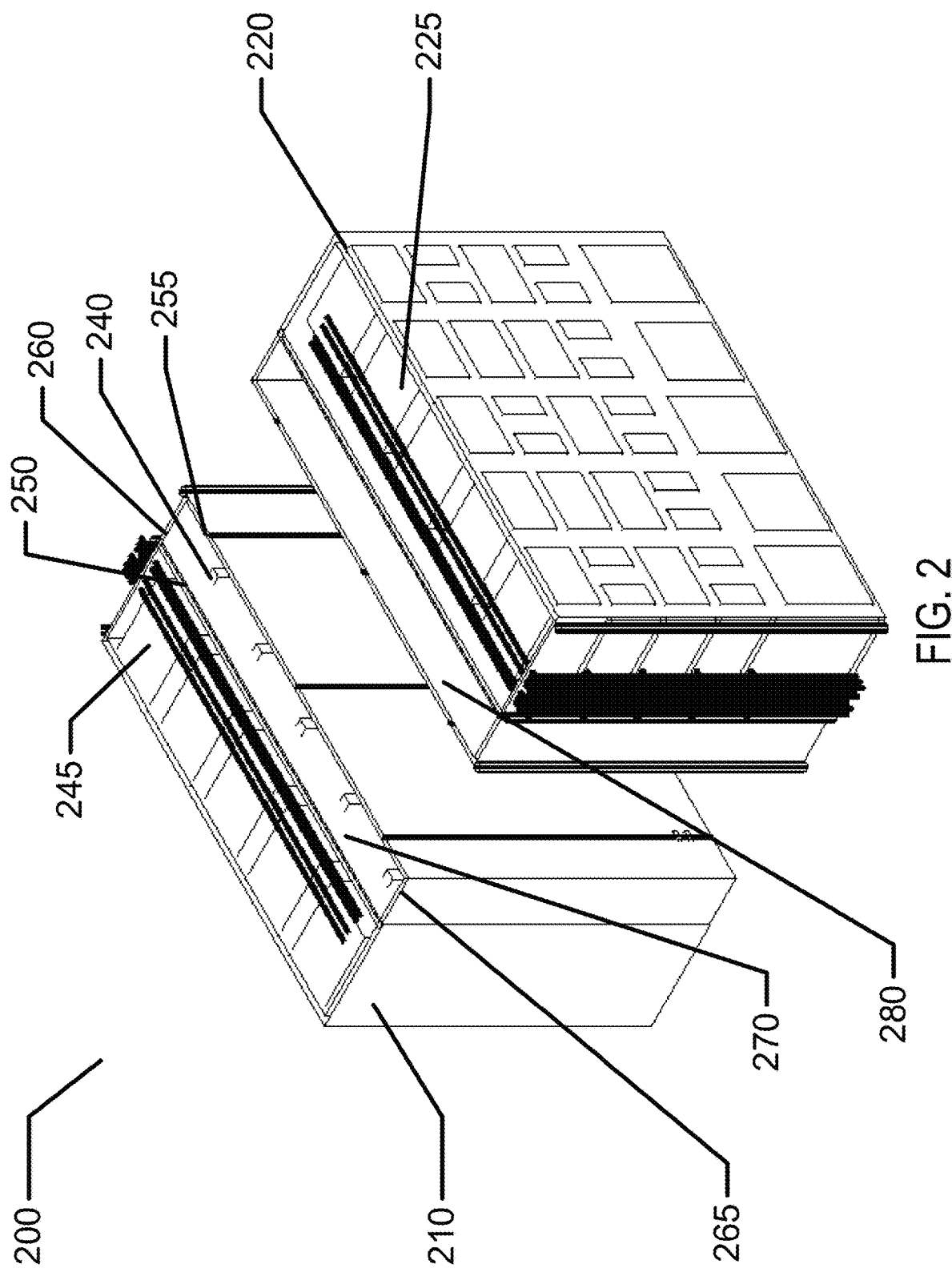
FIG. 2 illustrates an exemplary set of collocated cleanspace fabricators for different types of processing in a single location.

Proceeding to FIG. 2, item 200 two essentially planar cleanspace fabricator elements are depicted. Item 210 depicts a first cleanspace element, which in an exemplary sense, may show a cleanspace fabricator where the substrate type is semiconductor wafers and the equipment or tools used to process semiconductor wafers into integrated circuits on wafers may be depicted for example as item 245. Item 210 is a cleanspace fabricator, and one embodiment type of such a fabricator may have the following distinguishing characteristics. The fabricator has a cleanspace, item 270, which is bounded by walls which span numerous tooling levels. In some embodiments, items 250, 255, 260 and 265 may define walls surrounding the cleanspace 270. Within cleanspace 270, may be located the ports of various processing tools, for example, one of which is depicted as item 240. For that processing tool, on the other side of the cleanspace boundary, item 250, the body of the processing tool may be represented as item 245. In some embodiments, airflow to create the clean environment of the cleanspace may proceed in a unidirectional manner from and through wall 250 to and through wall 255. In other embodiments, the direction of the flow may be reversed. In still other embodiments the flow may proceed from wall 250 to wall 255 but do so in a non-unidirectional manner. In some embodiments, walls 260 and 265 may simply be smooth faced walls which do not relate to the flow of air around them, alternatively the walls may either correspond to air source walls or to air receiving walls. As well, the nature of the air source walls may be defined by placing HEPA filters upon the wall and either flowing air through the wall and then through the HEPA Filters or alternatively flowing air to the HEPA filters and then flowing the air out of the filter surface into the cleanspace. There may be other embodiments of the cleanspace type where the airflow in unidirectional fashion or in non-unidirectional fashion may be flowed from the top of the cleanspace to the bottom. There may be numerous manners of defining the airflow within a cleanspace consistent with the art of cleanspace fabrication.

Within the cleanspace, item 270, there may be located automation which is capable of processing wafer carriers which contain the substrates to be processed. In an exemplary fashion, in embodiments where cleanspace fabricator element 210 is formed to process semiconductor wafers to create integrated circuits, the cleanliness requirements of the cleanspace fabricator may be significantly demanding. As shown in FIG. 2, the processing tools may be arranged in a vertical and horizontal manner which in some embodiments may be termed a matrix; that is where tools are generally located at discrete vertical heights or levels and then at various horizontal locations between two standard vertical limits. As the substrates are processed and various electrical elements such as in a non-limiting sense, transistors, resistors, and capacitors are formed and then electrically interconnected with conductive lines, at some point the device structure with its interconnections may be completed. The resulting wafer is an embodiment of one type of product of such operations in a cleanspace fabricator as are the individual results of each processing step. Yet the fully formed product may now have completed the time it needs to spend in the highly clean environment of cleanspace fabricator element 210. A wafer in such a completed form may then be ready to be further processed in manners that may require cleanspace processing but at a significantly less severe cleanliness requirement. As may be apparent, cleanspace fabricators provide an innovative manner to continue such processing. In some embodiments, a similar essentially planar cleanspace fabricator, item 220 may be located in the general vicinity of fabricator 210. The cleanspace, 280, of this fabricator 220 may as mentioned be operated at a lower cleanliness requirement when compared to cleanspace 270.

Processing on the substrate, in the wafer form mentioned, may continue in this second cleanspace fabricator element, 220, through a variety of processing steps in a variety of testing and assembly type tools, depicted in an exemplary sense as item 225. The types of testing that may be performed include testing of transistor parameters on test devices, testing of the parametrics of other test devices that model devices or yield related structures, testing of test devices that represent circuit elements within larger devices and testing of fully formed integrated circuits for various aspects of their functionality. In addition, testing on a wafer level may be performed on structures that test for the reliability aspects of the processing that has occurred. Other types of testing may involve characterizing physical aspects of the processing that has occurred on the substrate like for example physical thicknesses and roughness for example. Still other embodiments of testing may characterize defectivity aspects of the wafer processing as for example incorporated particulates, missing or extra features on the processed device or other measures of defectiveness. There may be numerous forms of testing that may occur on the substrate which has been processed in a first type of cleanspace environment.

Other processing which may occur in fabricator environment 220 may include steps which take the wafer form of substrate and create different forms of a second substrate type which may be further processed in fabricator 220. An example of such a second form may include "Dice", "Die" or "Chips". These items may commonly be rectilinear pieces that are cut out of the wafer form substrate. Some of the exemplary processing steps that may be performed in tools of the type that would be placed in fabricator 220 may include thinning of a wafer or die, cutting processes to create the die from the wafer form. Other examples may include polishing steps that can be performed after wafer thinning is performed. The wafers may also have various films and metals deposited on the top or bottom side of the wafer substrate for various purposes.

Other classes of wafer processing that can occur in an "assembly" portion of a multiple substrate cleanspace fabricator may relate to the general processing steps classified as "Wafer Level Packaging" steps. In these steps the thinning, coating and other processing steps to create interconnects and encapsulated package elements are all performed on a wafer level format.

Some of these steps, in other embodiments may relate to chip level packaging. For example, substrates in die form may be attached, glued, affixed or bonded to various forms of metal or insulator packaging. The packages that the dies are mounted to may typically have electrical leads that come out of them in between insulating and hermetically sealing regions. The connection of metal lines from the integrated circuits to the package leads can occur with numerous processing including for example, wire bonding and flip chip or solder bump processing . . . in some processing conductive adhesives, epoxies or pastes may be applied. Thermal processing and annealing may be performed on the wafers, dies or packaged die forms. There may be many other types of processing standard in the art of packaging that would comprise different types of tooling in the exemplary fabricator 220.

More complex processing of the die may occur relating to various 3d packaging schemes where the end product may have in some embodiments multiple levels of die stacked upon each other. Some of the exemplary process types that drive various types of tooling for the processing include thru silicon via processing, die stacking, interposer connection and the like. As mentioned, regardless of the sophistication of the various packaging schemes, processing of substrates of a die form may occur in a cleanspace fabricator environment.

Figure 3:
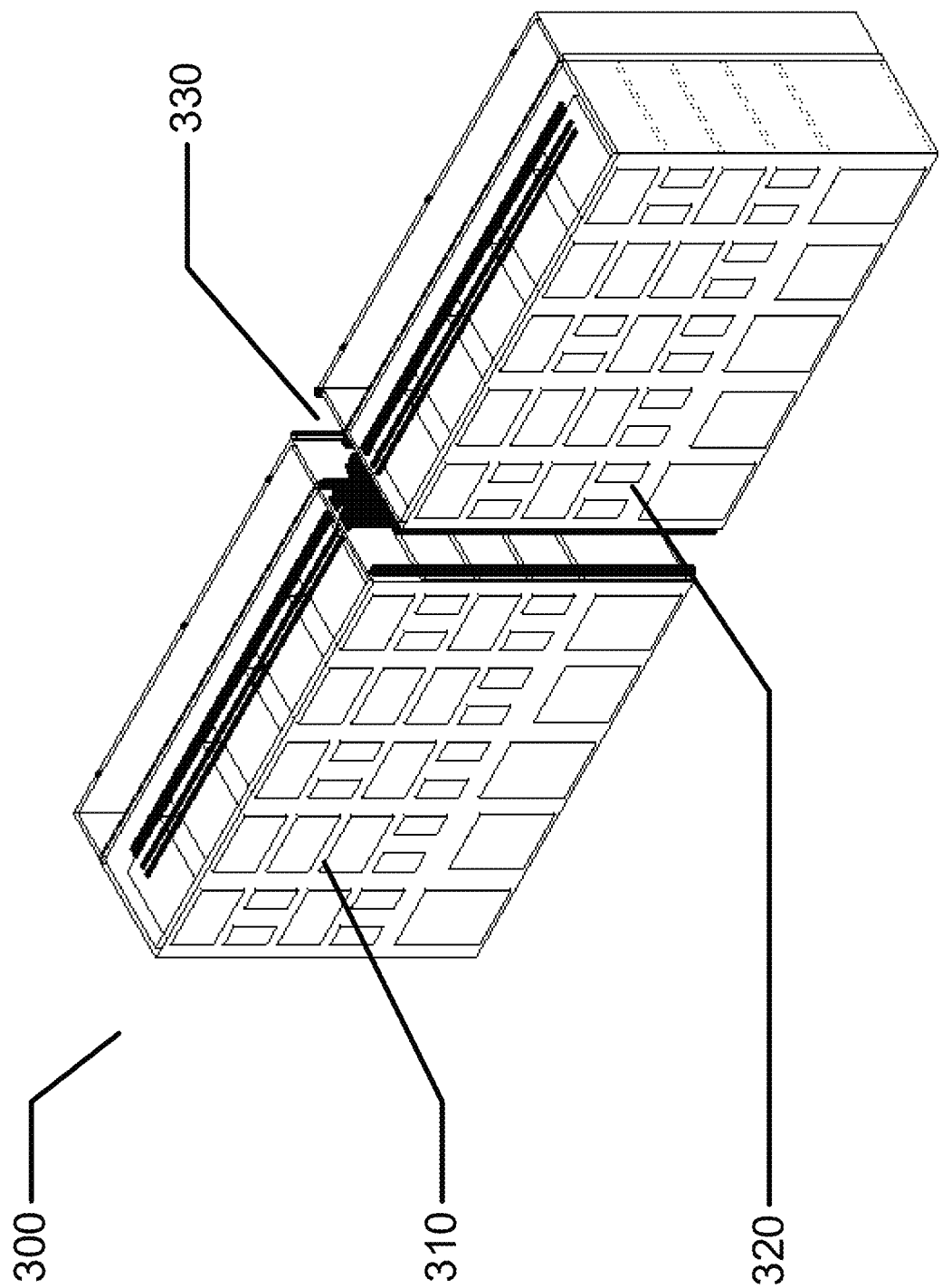
FIG. 3 illustrates an exemplary embodiment where two different cleanspace environments are created in a single cleanspace fabricator design with an intermediate wall.

Proceeding to FIG. 3, item 300, a representation of a different way to configure a cleanspace fabricator to process different types of substrates is shown. In a similar fashion of item 200, there are two different fabricator elements for different cleanspace types. Item 310 may represent a cleanspace, in an exemplary sense, that is of high cleanliness specification, consistent with processing of integrated circuits into semiconductor substrates. Additionally, item 320 may represent the lower cleanliness specification cleanspace environment consistent with "assembly" processing. The two cleanliness environments may be formed in this embodiment type by the insertion of a physical separation, shown as item 330, with an essentially planar fabricator type. Item 330 may be as simple as a wall, or as shown may be two walls on each fabricator element side with various equipment running in between. As mentioned before there may be numerous means to establish the cleanliness of the cleanspace environment through various types and directions of airflow consistent with the art herein.

Exemplary Types of Cleanspace Combinations to Form Collocated Composite Cleanspace Fabricators.

In FIGS. 4A-4H, there are various embodiments of cleanspace fabricators and some exemplary derivations of those types that form fabricators with multiple cleanspace environments associated with processing substrates to different requirements of cleanliness of environment where the multiple environments are at a collocated site. Item 410 and 420 depict simple annular, tubular cleanspace fabricators. Item 410 is a round annular tubular cleanspace fabricator and item 411 may represent a typical location of a primary cleanspace in such a fabricator. Item 420 may represent a rectilinear annular tubular cleanspace fabricator with its exemplary primary cleanspace represented as item 421.

From the two basic cleanspace fabricator types, 410 and 420 a number of additional fab types may be formed by sectional cuts of the basic types. A sectional cut may result in a hemi-circular shaped fabricator, 430 with its exemplary primary cleanspace as item 431. A section cut of item 420 may result in an essentially planar cleanspace fabricator, similar to that discussed in previous figures, where the primary cleanspace is represented by item 441. And in another non-limiting example, a cleanspace fabricator of the type 450 may result from a sectional cut of type 420 where it too may have a primary cleanspace indicated by item 451.

When these various fabricator types are combined with copies of themselves or other types of cleanspace fabricators, a new type of cleanspace fabricator may result which is a composite of multiple cleanspace environments. A few of numerous combinations are depicted. For example, item 460 may represent a combination of a first fabricator of type 430 with a second fabricator of type 460. Item 461 may represent a first cleanspace environment in this composite fab, 460 and item 462 may represent a second type of cleanspace environment. Alternatively, item 470 may be formed by the combination of two versions of fabricator type 440, where the two, different primary cleanspace environments are shown as items 471 and 472. This fabricator shares similarity to the type of fabricator depicted in item 300. Another exemplary result may derive from the combination of two fabricators of the type 440 as shown in item 480. Item 480 may have two different primary cleanspace regions, items 481 and 482. And, in some embodiments, item 483 may represent a third cleanspace region. It may be apparent that the generality of combining two different cleanspace elements to form a composite fabricator may be extended to cover fabs made from combinations of 3 or more fabricator cleanspace elements.

Multiple Automation Systems in Cleanspace Environments for the Processing of Multiple Substrate Types.

Figure 5:
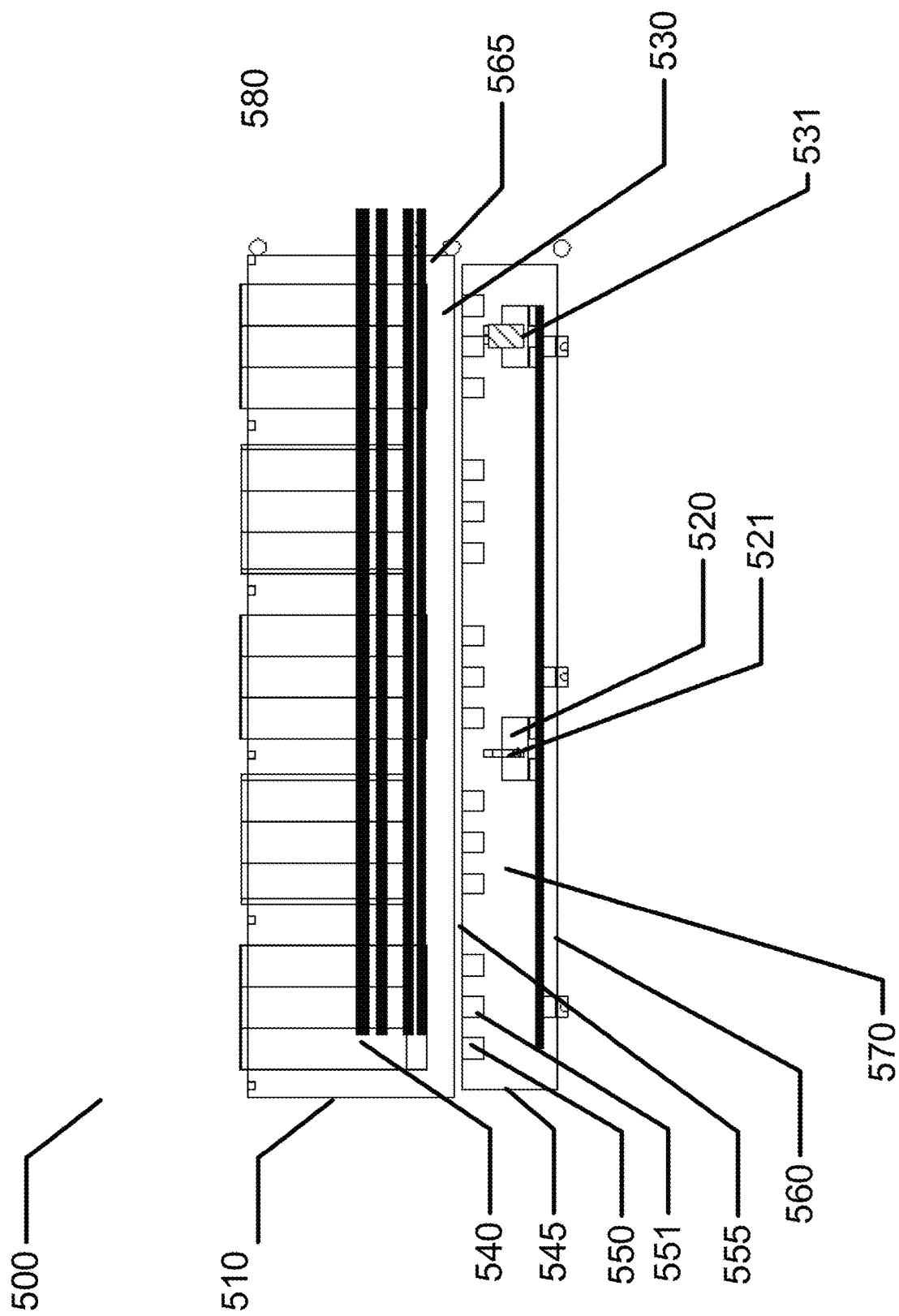
FIG. 5 illustrates an exemplary cleanspace fabricator for processing multiple types of substrates where a single cleanspace environment is utilized with multiple and varied types of automation.

An alternative type of cleanspace environment for processing of multiple types of substrates may be represented by item 500 in FIG. 5. In a fabricator of this type, 510, there may be only one cleanspace environment represented as item 570. In some embodiments, this cleanspace may be defined by a unidirectional airflow flowed from or through wall 555 to wall 560 where walls 545 and 565 are flat walls. In some embodiments, there may be a tool port, 550 which resides significantly in the cleanspace, 570, which may be called a fabricator cleanspace in some embodiments, while a tool body, 540 resides outside this first cleanspace 570.

In some embodiments, the cleanliness of the cleanspace environment, 570, may be uniformly at the highest specification required for any of the processing in the fabricator environment. In such embodiments, therefore, the environment may exceed the needs of other processing steps that are performed within it. Since there may be multiple types of substrates processed in the environment, as for example wafers and die form, there may need to be two different types of automation present to move substrates from tool port to tool port. For example, item 520 may represent a robot that is capable of moving wafer carriers through the use of a robotic arm 521. And, item 530 may represent a piece of automation that is capable of moving die carriers through use of a different robotic arm 531, from tool port to tool port. In fabricators of this type, in some embodiments there may be tools that have two different types of tool port on them, one consistent with handling a first type of substrate like for example wafer carriers and another capable of handling die carriers.

In some embodiments, in a non-limiting sense, such a tool might include a tool for dicing wafer into die. In this case, carriers with wafers would be input into the tool through one port shown for example as item 550 and then die carriers may leave the tool through tool port 551.

Other manners of processing multiple substrates may include for example tools which take substrate carriers from a region external to the cleanspace fabricator like item 580 and place them into the cleanspace environment through a tool port. In a similar fashion, substrates in various types of carriers may also exit the fabricator environment through a processing tool to an external environment like 580 as well. Alternatively, there may be other means to directly introduce or remove substrate carriers into the cleanspace environment directly through a cleanspace wall, for example through wall 545.

In any of the cleanspace fabricator embodiments where multiple types of substrates are processed within a single type of cleanspace environment there may be need for multiple types of automation. This may be true for the type of single fabricator environment shown in item 500 or alternatively for the composite types shown previously where multiple substrate types are processed. It may be clear, that another embodiment may derive where the automation devices, like item 520, are capable of handling multiple substrate carrier types.

Types of Carriers that May be Processed within Composite Cleanspace Fabricators

Figure 6:
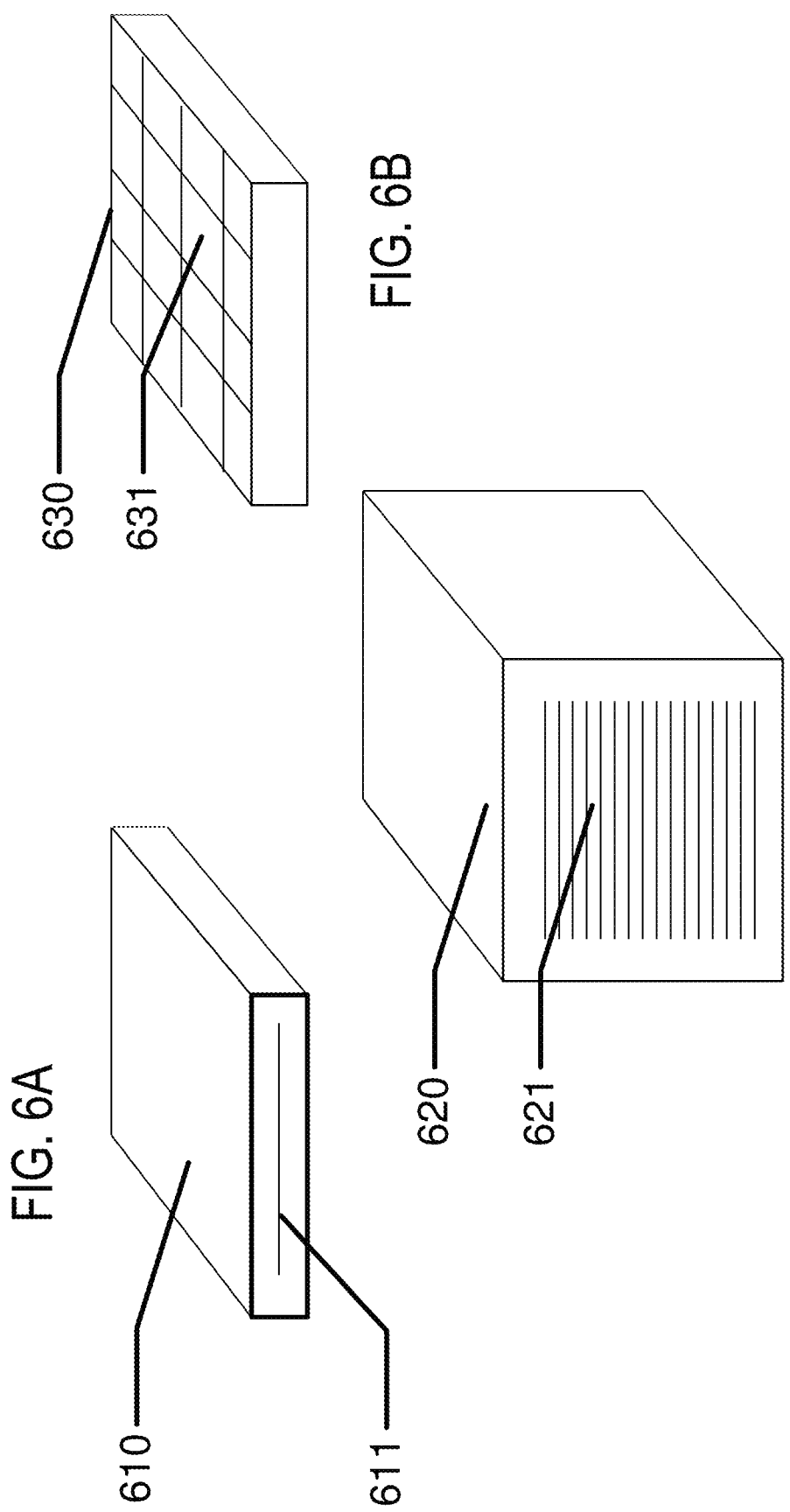
FIGS. 6A-6C illustrates examples depicting different types of substrate carriers that might be processed in different processing tools including a single wafer carrier, a multiple wafer carrier and an exemplary waffle pack carrier.

Proceeding to FIGS. 6A-6C, there are a number of substrate carriers that are depicted for example. In item 610, there is depicted an exemplary substrate carrier where one, 611, substrate piece is included. In some embodiments, the substrate piece may include a semiconductor wafer where the wafer has a dimension of roughly 2 inches. In other embodiments, the substrate piece may include a semiconductor wafer where the wafer has a dimension of 8, 12 or 18 inches. In still further embodiments, the substrate piece may be a round, square or sheet which includes semiconductor, metallic and/or insulating material Other types of carriers may have the capability of containing numerous substrate pieces. For example, item 620 may represent a multiple substrate carrier where items 621 are the multiple substrates. There may be numerous types of substrates which include but are not limited to the types discussed in the previous discussion of a single substrate carrier. Some examples of such a carrier might include SMIF pods and FOUPS in the semiconductor industry.

As mentioned in the previous discussions, some substrate types may be defined from pieces of a larger substrate which has been cut into smaller segments. These pieces may be carried around in various types of carriers. An example may be a "waffle pack" 630 where the carrier has multiple wells or chambers 631 into which the segmented substrates may be placed and then carried for further processing.

It may be apparent that a cleanspace fabricator may be capable of processing numerous types of substrates where the substrate processing needs to occur in a clean environment. Although examples of certain substrates have been included, the spirit of the invention is intended to embrace the inclusion of all the different types of substrates that may be processed in a cleanspace fabricator.

Touch Screen Displays as Substrates

In an example of how the cleanspace fabricator environments that have been discussed may be utilized, consider a substrate running in a cleanspace fabricator to be a 4.75 inch by 2.5-inch piece of touchscreen glass. In some embodiments, the example substrate may already have the multiple layers comprising the touch screen elements and the display screen elements upon it. In other embodiments, the layers of conductive electrodes, adhesive and spacer layers, surface treatments for display cleanliness etc. may all be process towards the end of the production process.

In an example, the Touch Screen may have its capacitive, resistive, piezoelectric or other detection schemes films already placed upon the glass. As well the LCD or OLED or other display screen components may also be already deployed upon the substrate. Protective films may be applied to the front side of the Touch Screen so that it may be handled by automation equipment in the cleanspace fabricator. The various elements and films may limit the temperature, electrical charge, magnetic field environments that the substrate may be subjected to in further processing. Nevertheless, the exemplary touchscreen piece may comprise an acceptable substrate for a cleanspace fabricator.

The touchscreen and display components may have electrical connections that are formed upon the back of the Touchscreen substrate. In some embodiments, layers of flexible connector or flexible substrate materials may be connected and stacked upon the back of the substrate, forming routing lines for signals and power. These processing steps may occur in a cleanspace fabrication environment. Although the sensitivity to particulate components may be less for these applications than for making integrated components, particulate control will nevertheless be necessary as may be achieved in the cleanspace environment.

In an alternative to flexible connector substrates, in other embodiments metallic films may be deposited and imaged to create conductor patterns. Lithography together with etching techniques, such as reactive ion etching or wet chemical etching may be used to etch the metallic insulator layer. By combining the processing of imaged metal layers and dielectric layers with via holes, a multilayer routing scheme may be processed onto the back of the Touchscreen Substrate. These routing lines or conductive traces may interconnect the Touchscreen components to each other or to electrical circuitry. As well, the interconnect traces may connect electrical components to each other regardless of whether for those particular traces, a touch screen component is connected. The substrate can support the interconnection of various components.

Touch Screen Products Fabricated in Cleanspace Fabricators

Figure 7:
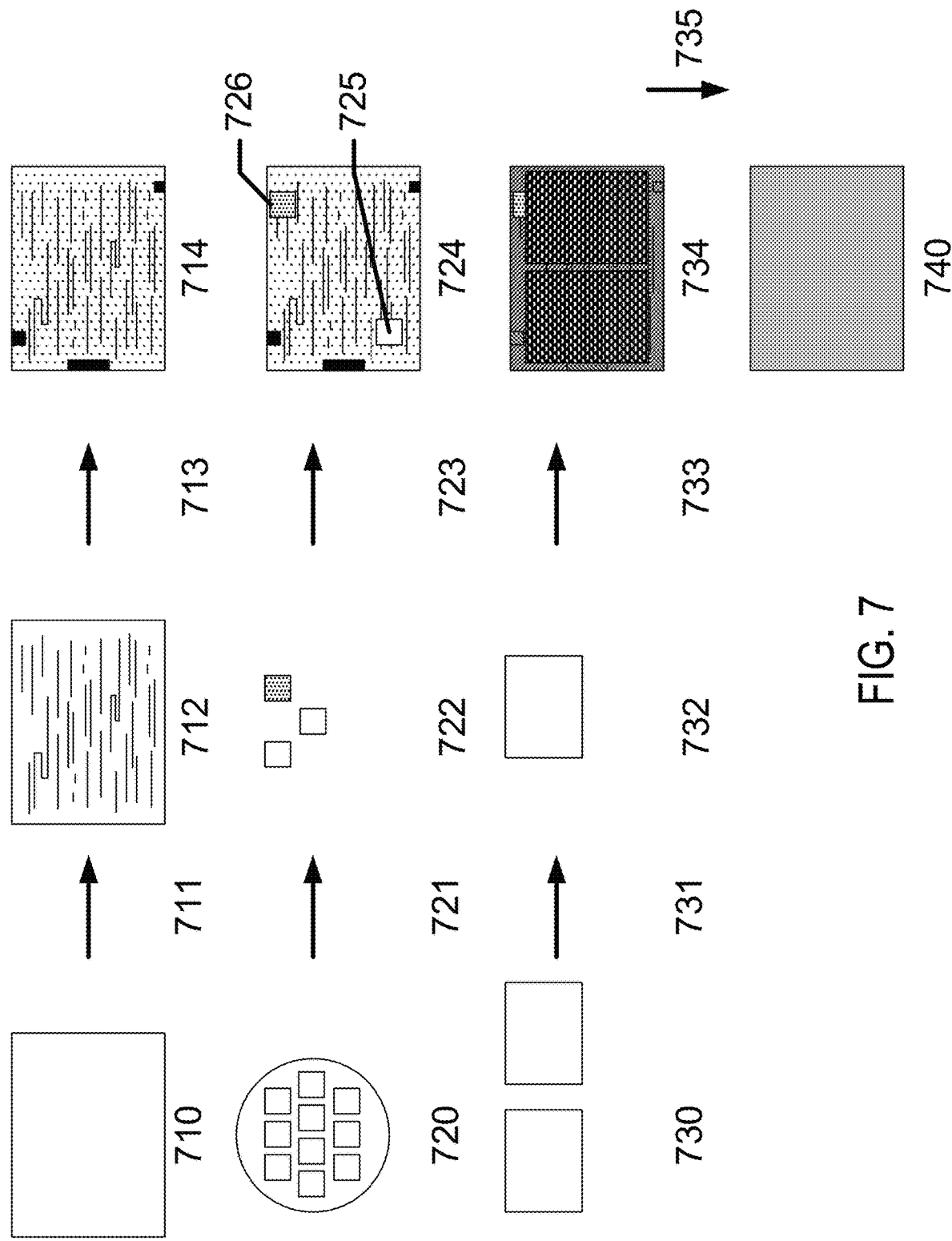
FIG. 7 illustrates processing of different substrate types in cleanspace environments resulting in a product combining devices from the different substrate types.

Proceeding to FIG. 7, the touch screen processing described in the previous section as well as a more general discussion of fabricating touchscreen based products in cleanspace fabricators may be found. At 710, a Touchscreen type substrate is depicted. It may have touchscreen elements, display elements and input/output elements like switches already configured upon it or these may be attached at a later time.

At 711, the processing to make a multilayer routing scheme of imaged metallic traces separated by insulator levels with via interconnects may occur. In some other embodiments, multiple layers of flexible interconnect layers may be adhered and interconnected at 711. The result at 712 may be a Touchscreen substrate that has interconnection traces upon it. The topmost later of interconnects may have terminal via points were additional components may be connected.

Before connecting additional components at 713 a layer of encapsulating material may be applied to the substrate. The encapsulating material may be comprised of various polymeric materials and adhesive materials like epoxies for example that have both insulating properties and chemical encapsulating properties. In some embodiments, the materials may be applied by spray processes or rolled applicators or other bulk application processes which may be followed by steps to create via holes in the layer for interconnection of other devices. In other embodiments, the materials may be directly printed upon the substrate. With three-dimensional printing techniques or more generally with additive manufacturing technologies, the encapsulating layer may be built upon the substrate during step 713 and have missing printed features for vias. In other embodiments both encapsulating features and conductive vias may be added to the layer by additive manufacturing processing. In an example, an insulating epoxy and a conductive epoxy may be used to create a layer that has predominantly insulating regions as well as conductive vias. Other additive manufacturing processes may create metallic features at the via locations as for example with a power based laser sintering process.

The conductive films of conductive epoxies or of sintered powder based deposits may comprise Titanium, Gold, Silver, and Copper for example. And the starting material for the powders or within the epoxies may comprise microscopic and nanoscopic powders made from Titanium, Gold, Silver and Copper as examples.

The resulting encapsulated Touchscreen substrate with multilayer interconnect schemes may be found at 714. In some embodiments, external components for external connections and input/output functions may be added to the substrate as shown in exemplary form as the solid black features at 714. These features may represent power interconnections, signal interconnections, switches of various kinds and the like.

Another type of substrate to run in the same cleanspace fabricator or in an attached or associated cleanspace fabricator may be a semiconductor substrate as shown at 720. Through numerous processing steps, integrated circuit components may be manufactured upon the semiconductor substrate in manners related to those discussed in other inventive art associated with cleanspace fabricators. The resulting product wafer at 720 may subsequently be processed at 721 to thin the substrate material and in some embodiments to singulate the integrated circuits creating "Die" or "Dice" as shown at 722. These dice may be added to the Touchscreen substrate during the process at 723. The processes at 723 may include flip-chip solder ball related attachment as an example but the general art of connecting integrated circuit die to packaging may be consistent. In the case of the depicting at 724; however, the die may be attached in a non-packaged form directly to the touchscreen substrate as item 725 for example. The die may be tested at various points both before being attached to the Touchscreen substrate and after being attached.

In a subsequent section, three-dimensional assembly and three-dimensional IC manufacturing techniques will be discussed. The result of these processing steps may likewise be attached at step 724 in the location identified as items 726.

In some embodiments, the three-dimensional assembly processing may occur stepwise and use the Touchscreen substrate to support the die as they are processed and ultimately attached to the substrate.

At 730, a third type of substrate may be processed through the cleanspace fabricator environments. A critical component in electronic products is the energization elements that power the function of the products. In some embodiments, these elements may be batteries which may typically be rechargeable type batteries. The basic structure of batteries of various types may include a cathode electrode along with a cathode chemical moiety electrically connected to the cathode electrode. The cathode, both electrode and chemistry, may be then contacted to a separator region along with an electrolyte in the separator region. The separator region may allow the electrolyte or ionic portions of the electrolyte to transfer across it. On the other side of the separator region may be the anode region which may comprise both an anode chemical moiety and an electrically connected conductive anode electrode. The construction of structures of this type may be performed in a cleanspace fabrication environment. At 731, the two conductive electrode plates may be processed to form a cathode/separator electrolyte/anode structure. Rechargeable solid-state batteries as well as chemical form batteries may be constructed. In some embodiments large plate batteries, sometime of more than two electrode levels may be formed at 732. In other embodiments, that may preferably be constructed in cleanspace environments, the battery plates with 732 may be formed of numerous individual battery regions which form many different battery cells. The techniques and requirements to form such batteries may be favored by the processing environment of a cleanspace fabricator.

There may be numerous reasons to assemble the battery units with multiple cells. The individual cells may be connected in various parallel and serial fashions for different purposes, and they may be attached to integrated circuits which control the use of the individual battery cells. The integrated circuits may control the charging and discharging of the multiple cells as well as sense their functionality for defective and non-functioning cells.

Batteries have significant energy storage capabilities. However, fuel cells offer the potential of multiplying the energy storage capabilities. Fuel cells function by extracting the chemical energy of chemical feedstock. Various chemical species have been used in standard fuel cell technology. Gasses such as hydrogen have been used, but liquids may also be used. Methanol and Ethanol may have the capability ultimately of a ten to twenty-fold increase in energy density.

A fuel cell is made of multiple layers that are similar to a battery construction. Conductive anode and cathode contacting layers are used to collect the charge carrying species. However, the chemical feed stock must be able to move from external to the fuel cell to anode layers that also include catalysts for the dissociation of the chemical species. A permeable membrane may separate the anode catalyst from the cathode catalyst layer. A permeable layer to oxygen flow may separate the catalyst from the cathode conductive layer. The above discussions may describe in general terms the types of layers that may be comprised in batteries and fuel cells to illustrate the applicability of the cleanspace fabrication environment to the construction of devices of these types.

In some embodiments batteries may be fabricated, in other embodiments fuel cells may be fabricated. In other embodiments regions of batteries and regions of fuel cells may be fabricated. These elements may be directly fabricated upon each other or at 734 they may be fabricated directly up the assembled devices on the Touch screen substrate. At 733, in embodiments where the fuel cells and/or batteries are made separately from the touchscreen substrate they may be added and connected to the Touch screen substrate. The electrical connection and bonding of the devices again may benefit from a clean environment for defect mitigation. The connected battery and fuel cell components may also be coated and encapsulated by various techniques at 734. A cleanspace fabricator environment may assemble complicated technology processing tools of various kinds in single locations. Particularly when the tools are smaller in size, this may allow for the ability of constructing more complicated battery and fuel cell structures in processes that are similar to that utilized in semiconductor and MEMS processing.

In some embodiments, the described components may define an entire functional touchscreen device such as a mobile phone or a tablet or lap top computer. At step 735 the resulting product may next be encapsulated and finished in various manners to form the device at 740. In some additive manufacturing steps, a plastic body layer may be formed. In other steps, a metal case may be formed by additive manufacturing. Alternatively, a fabricated metal cover may be adhesively attached to the touch screen substrate device. By incorporating many components into small devices, the potential exists for the heat created by the components to cause thermal issues. Additive manufacturing may also provide for the ability to embed thermally conductive structures that spread and dissipate thermal load from hot spots through the entire device.

There may be abundant variation in the processing of products like that described at 740. In the exemplary description, the use of direct encapsulation may offer enhanced structural strength and chemical resistance. In addition to higher strength design potential or lower material weight of the structure, these factors may allow for novel embodiments to fill fuel cell power sources and may even include immersion of portions of the device in the chemical feedstock since the encapsulation may protect components from exposure.

A cleanspace fabrication entity that can tie together so many elements of construction of complicated electronic devices may provide numerous and significant advantages for a development process. Many aspects of the design process may flexibly be changed with the cleanspace fabricator based infrastructure, such as improved times and cost factors. In addition, the quality of products will improve with the ability to produce more prototypes in actual forms at lower prototyping costs.

Advantages also exist for manufacturing in such environments. In practice, the cleanspace fabricator environment may be a small tool based environment that occupies the same cleanspace as the other processing types. Alternatively, a large tool semiconductor cleanspace fabricator may be attached to other cleanspace fabricators for the other processing and the assembly processes. Advantages will increase as the complexity of components integrated into products increases.

3DIC Techniques in Cleanspace Fabricators

Figure 8:
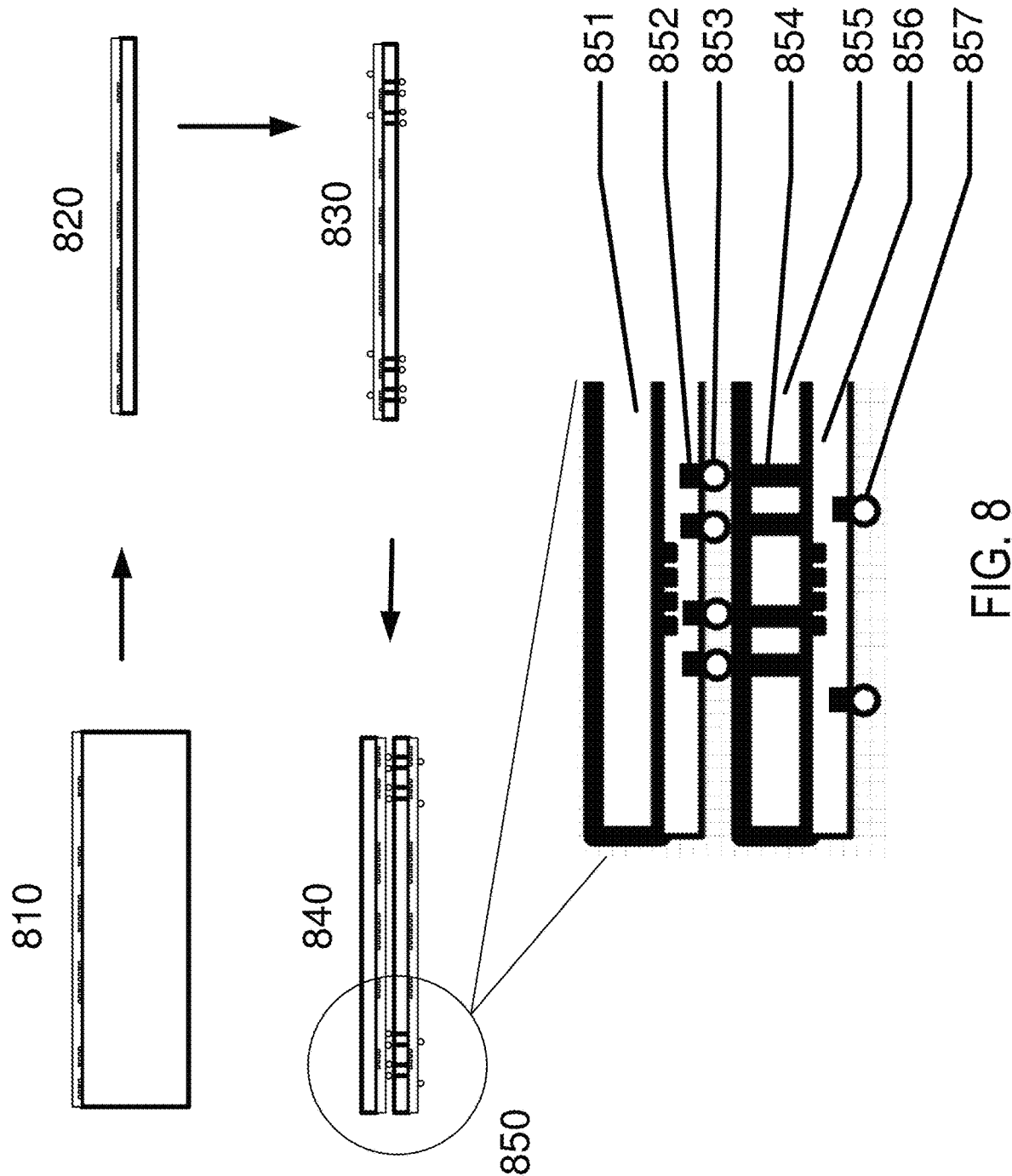
FIG. 8 illustrates examples of processing that occurs in three-dimensional Integrated Circuit or three-dimensional packaging technology.

Proceeding to FIG. 8, a depiction of an exemplary processing flow for Three Dimensional Integrated Circuits (3DIC) is shown. A related field of Three-Dimensional Chip Packaging will be enabled in much the same manner for a cleanspace fabricator environment. At 810, a cross section of a semiconductor wafer for a region of a portion of an integrated circuit is depicted. A thin region on the substrate contains and supports the integrated circuit, while a bulk of the substrate is relatively unrelated to the function of the integrated circuit. A typical process, at 820, may result from thinning the substrate, at least in regions of the wafer. At 830 various features related to 3DIC or 3D packaging may be formed including through silicon vias and solder ball features. The results at 830 in various forms may then be stacked either upon each other or upon packaging structures to exploit three dimensional spaces at 840. In some embodiments, substrates with structures such as through silicon vias may be formed, either with or without associated circuitry.

In the inset of 850, a schematic relationship of the various aspects of 3DIC or 3D packaging may be observed. In the depiction a substrate, 855 with circuitry upon it at 856 may have through silicon vias processing at 854. The vias may make an electrical connection from the front of the substrate where the circuitry is to the back of the substrate. At the back of the substrate interconnection features such as the solder balls depicted at 853 and 857 may connect a next circuit on a substrate at 851 through the metal layers of the circuit at 852.

The various processing steps, related to 3DIC and 3D packaging, are easily incorporated into cleanspace fabricator type structures. Substrate or Silicon reactive ion etching to create through silicon vias as well as the thinning operations on substrates, the processing to create interconnection elements such as solder balls and the like are consistent with a cleanspace environment where a cleanliness level of the environment is positive to the quality of the result.

The cleanspace environment based fabricators may create a new infrastructure that enables cost effective operation at small substrate size. The use of small substrates for the IC processing also creates additional advantages for the 3DIC and 3D Packaging processes. A small substrate may be made much thinner in its initial form; for example, a two-inch substrate may start at 280 microns of thickness while an eighteen-inch substrate may start at 925 microns of thickness. In some 3DIC and 3D Packaging processes portions of a wafer will be thinned leaving edge rings or internal ridges to support the wafer while being processed for the 3D related needs. A smaller substrate may start out thin enough, or be fully thinned across its body, or have a much thinner portion of the substrate after a thinning process. In addition, angular errors in the alignment of the front of substrates to the back of substrates result in far smaller errors in distance terms the smaller the radius of processing is from the center of the wafer. All of these aspects may improve processing costs, times and quality as well as enabling more processing flexibility for novel processing.

Additive Manufacturing in Cleanspace Fabricators

Additive Manufacturing may represent a class of fabrication techniques that place material into or upon manufactured items to realize three dimensional forms that are represented in a digital format. An example of such a technique may be three-dimensional printing where droplets of material are placed upon a substrate in a similar fashion that ink is placed upon a paper as either the paper passes under a printing component or the printing component moves above the paper. Another additive technique may be stereolithography, where a substrate is immersed in a liquid of reactive material and lowered layer by layer as a laser pattern writing source hardens reactive mixture in select regions of each layer. There are similar powder based additive manufacturing formats as well just to name some examples. Various materials may be shaped in these manners including metals, insulators, gels and the like. Composite materials may also be formed that may mix these materials or incorporate other materials in a matrix that is grown—such as the forming of three dimensional lattices of cellular material.

Additive Manufacturing techniques are well fitted in a cleanspace fabrication environment. The ability to prototype shapes based upon digital models allows for complex products that include semiconductor components to be rapidly formed. In the previous example of Touch screen based processing for example encapsulating material may be processed by additive manufacturing techniques. In some of the examples metal features may be formed within the manufactured form for various reasons. The ability to process substrates in a cleanspace environment may allow for chips to be incorporated into product forms where the chip is never discretely packaged, an entire layer of the product may be encapsulated at a time. This may allow for smaller form factors with lower cost or improved technical aspects like strength and thermal dissipative aspects.

The use of raw die attached directly to a substrate formed upon an active Touch screen display substrate may allow for the integrated circuits to be tested as the assembly processing occurs. Since the testing may occur before any encapsulation of the semiconductor dice occurs and before the multilayer distribution levels are encapsulated, defective conditions found during the test may be remedied with various kinds of rework or use of redundant die attachment strategies.

As mentioned, manufacturing may be effectively carried out in the cleanspace environments. However, prototyping may be particularly effective in a fabricator environment with multiple types of fabrication as discussed. Changes to die design, changes to multilayer routing schemes, addition or removal of components or interface elements like switches or connectors can all be flexibly adopted into the digital models for the encapsulating and packaging/case designs for the finished products that can be manufactured using the additive design capabilities. The small tool cleanspace fabricator designs may have additional advantages since specialized processing tools or processing tools with engineering changes to support a prototype need are effectively supported in the environment of small reversibly replaceable tools that interface with tool chassis formats.

Figure 9:
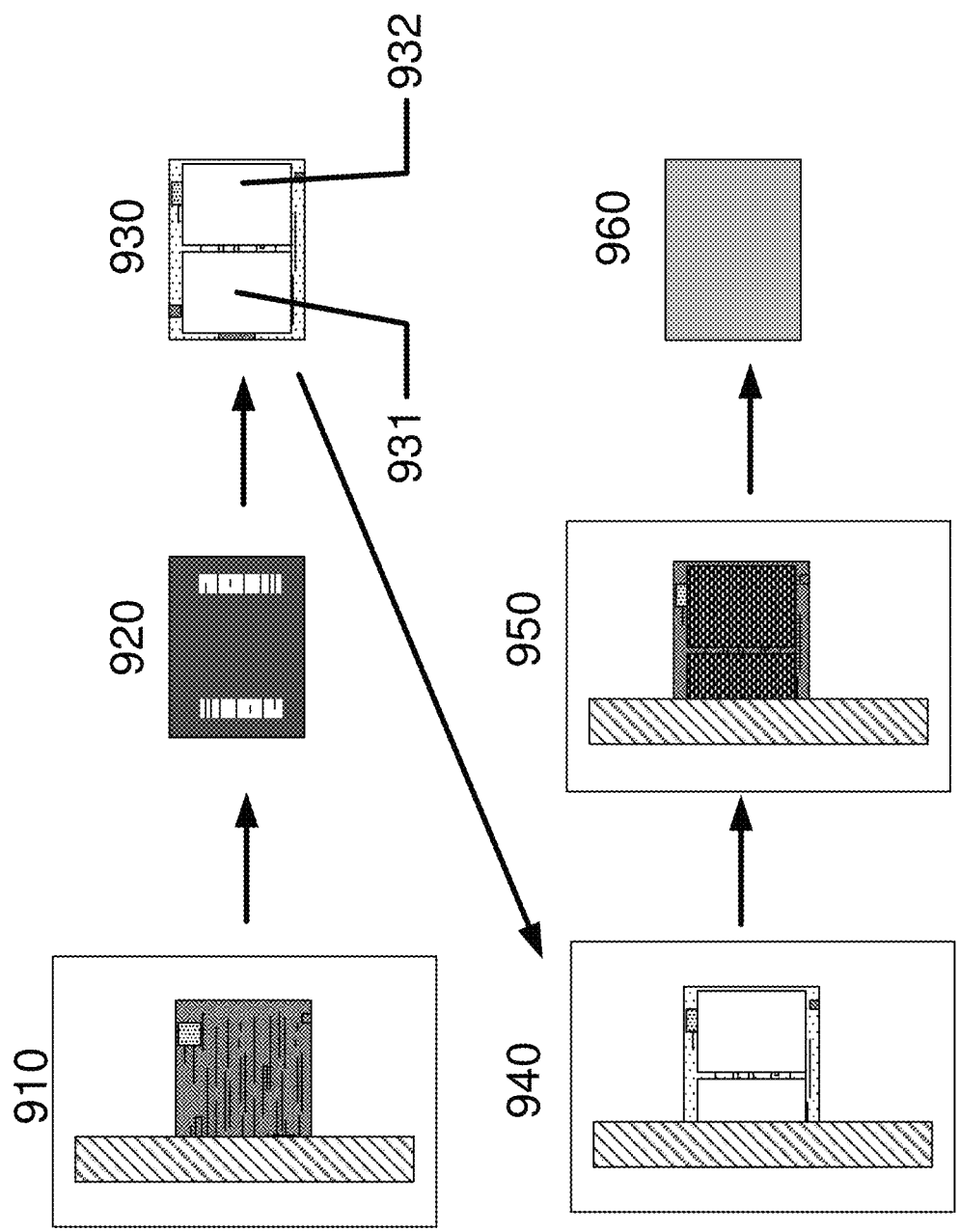
FIG. 9 illustrates examples of additive processing techniques that may be carried out in cleanspace fabrication environments.

Proceeding to FIG. 9, some aspects of additive design that may be carried out in the cleanspace fabricator designs may be found. Utilizing the exemplary Touchscreen type substrate as a base for examples, at 910 an additive manufacturing processing tool which may be located within multilevel cleanspace fabricator which has automation capable of handling the Touchscreen substrate may be depicted. The Touchscreen substrate may have been moved from one processing tool to this additive manufacturing tool by the automation tooling in FIG. 5 at 530 for example. In the example, the touch screen substrate may have had its final layer of metal interconnections deposited and then integrated circuits bonded in the prior operations. In the additive manufacturing tool, an encapsulating and sealing layer may be printed upon the substrate in select areas that have been digitally modeled to be appropriate for the substrate design and the needs to add components to it at subsequent steps. The result of the processing may be seen in the example of item 920 where a planarized film layer indicated in the solid black pattern with interruptions at bonding locations may be formed.

Continuing the example at 930 a set of energization elements may be added to the substrate. Item 931 may represent a battery component while item 932 may represent a fuel cell component being attached to the touch screen substrate. The substrate with attached energization elements may be moved by automation into an additive manufacturing tool at 940 where an encapsulation layer may be deposited across the entire device resulting in the coated piece shown within the additive manufacturing tool at 950. At 950, another additive manufacturing step may be performed to build the structural case around the encapsulated components. In some embodiments, metal casing may be formed by the additive manufacturing processes. In other embodiments, the additive manufacturing process may add plastic or polymeric materials to define the casing of the device. In still further embodiments, the additive manufacturing tool may add adhesives to the substrate in digitally modeled locations and a case plate may subsequently be placed upon the substrate. At 960 an exemplary finished piece may be found.

Fuel Cells in Cleanspace Fabricators

There may be numerous types of substrates and devices consistent with production in a cleanspace fabricator environment including micro scale machines, biological or standard fluidic processing cells and the like. An application of note related to the examples demonstrated herein may related to the design, development, prototyping and manufacturing of fuel cell components. There are designs of Fuel cell technology that have been around for decades; however, the construction of small fuel cell technology has many novel aspects to it and micro-scale elements may have particular sensitivity to particulate and other types of contamination. Construction of prototype fuel cells and production of novel small fuel cell designs fit well within the scope of manufacturing activities that benefit from the novel cleanspace fabricating environment.

The control and miniaturization ability of semiconductor processing tooling may offer advanced processing capabilities that may allow for more intricate and smaller scale features to be formed into fuel cell designs. In addition, as mentioned in prior sections, the flexibility of the cleanspace fabricator environment may allow for the fuel cell designs to be constructed upon device substrates of various types allowing for novel design aspects.

In addition, the structures that may contain the fuel for small fuel cells may also be designed, prototyped and manufactured in cleanspace fabricator environments. There may be novel methods of defining pores and membranes into the structure built upon the touch screen substrate. These structures may allow for the filling of chemical into a storage region of the fuel cell. The membrane structures may either allow ethanol and water to pass through, or be stored while filtering out or not absorbing other chemicals for example. There may be numerous means to fill a reservoir for a fuel cell. The encapsulating aspects of the additive processing on substrates processed in clean space environments may allow for novel structures to be formed which nonetheless are isolated from electronic components in the rest of the device.

Product Advantages of Cleanspace Fabrication for Prototyping and Manufacturing

To summarize, the cleanspace fabricator environment along with reversibly removable tools, particularly when the substrates to be processed are small creates a prototyping environment with high speed prototyping capabilities. This is with respect to the processing of substrates in the environment, but also relates to the creation of specialized tools or engineering changes to existing tool designs to support new processes, new materials or other novel requirements to make new types or designs of products.

The flexibility advantages may also relate to manufacturing of products. In some embodiments, tailored products or products with user selectable aspects may be manufactured with ease in cleanspace manufacturing environments with large numbers of processing tools based on the processing of smaller substrates. Customized product definitions may allow for customized security aspects as well for example. The environment may also result in lower part costs due to the lowered requirements on support personnel and the higher numbers of processing tools that may be required when smaller substrates are processed, which may result from economies of scale based on higher numbers of tools as well as advantages that standardization of parts in the small tool chassis models may afford. The fabrication of numerous types of products in the environment may be enabled. As demonstrated for example, Touch screen type products may in some embodiments be produced in large scale where the same environment is used to make the integrated circuits, the interconnection schemes, the touchscreen components, and the energization elements that comprise electronic devices with touch screens.

Two Sided Smart Phones, Smart Devices and Touchscreen Devices

Referring to FIG. 10A through 10F, a form of unique smart device that may be fabricated according to the methods and apparatus of the present disclosure is illustrated. At FIG. 10A, the front of a standard smart phone device 1000 is illustrated. The smart phone may have a small front facing camera 1003, a speaker 1002, a touch screen 1001 and activation buttons 1002. Referring to FIG. 10B, a unique second side screen 1010 of the smart phone device 1000 is illustrated. The second side screen 1011 may also have a typical rearward facing camera 1012 with a flash 1016. There may also be a speaker and microphone configured on both sides of the device. There may be numerous activation buttons 1013, 1014 and 1015 that may have numerous functions. Referring to FIG. 10C, the left side 1020 of the two-sided smart phone device is illustrated with exemplary buttons, switches, connectors and other such devices. For example, a ringer switch 1021 and volume buttons; up button 1022 and down button 1023 are shown with reference numbers. In FIG. 10D, an exemplary right side 1030 is illustrated. There may be various connectors, switches, buttons and the like that may be present but not enumerated, but an exemplary port 1031 for a memory device is depicted. Referring to FIG. 10E the top 1040 of the two-sided smart device is illustrated with two activation buttons 1041 and 1042. Referring to FIG. 10F the bottom 1050 of the two-sided smart device is illustrated with an earphone jack 1051, with a cable connector port 1052 and speakers 1053 as examples.

A two-sided smart phone, may refer to the fact that the front and the backside of the device may have functional screens such as touch screens that can display and sense touch based signals. There may be many different uses and functions of a second side touchscreen on a smart phone or another type of smart device. In the following figures, a number of examples are depicted.

Referring to FIGS. 11A and 11B, a set of exemplary functions which are activated and controlled by electronics connected to the second side touch screen are illustrated. The illustrated functions include an external switching control of the antenna 1110, an external switching control of the camera 1120, and an external switching control of the microphone 1130 as examples. There may be users, companies or organizations who want to have specific control over their smart device antenna, camera and sound sensing equipment for security and other reasons. Since in some examples an external party may have the ability to "hack" a smart phone or smart device with a wireless based attack and turn on the devices cameras or microphones or antennas even if the phone is set by software to have those devices off. The illustrated function may allow for a redundant and external means to switch the devices on and off. In some examples, as seen in referring to FIG. 11B the function may be activated by touching 1140 a touch screen displaying the particular function. In other examples the phone switches 1013, 1014 and 1015 may be used to control the state, whereas the display just displays the status of the device. There may be more sophisticated function that is activated relating to the components illustrated, such as for example monitoring modes that may indicate the software intended state of the device versus the physical state, or measurements about the amount of data that is passed by the devices or other such functions being displayed on a second side screen.

Referring to FIGS. 11C and 11D, some additional supplementary functions of a two-sided smart phone may be illustrated. At FIG. 11C, the second side screen 1010 of the phone may include functions such as external encryption functions 1150 and WIFI phone functions 1160. These functions may be activated by touching the screen 1170 or in other examples, buttons on the phone 1013-1015. In some examples, when a user is concerned about security on his phone encryption protocols may be activated with external encryption functions 1150. The encryption may function for example, by encrypting and decrypting data transmission which may be data transmitted over cellular services where the cellular service encrypts the data before transmission, or in other examples a service may encrypt data before it is passed over the cellular communication systems. Such a capability may allow for more protected user privacy while enabling such functions as GPS or other protocols, where a user may encrypt his identity in a manner that only selected services are able to decrypt. There may be a supplemental port on the phone that interfaces with integrated circuitry specifically for this functionality that allows for an external "token" or device containing decryption information. Alternatively, the function may be enabled by wireless pairing to user dedicated devices that contain encryption protocols, such as a smart watch, smart ring or other separate device.

Another type of encryption may be activated to deal with data stored on the smart device. An encryption device may intercept data transmission from storage devices such as flash memory and other parts of a smart device and encrypt and decrypt the data during its function. In such examples, the user may activate the encryption function to "lock the data" in the storage devices.

WIFI based communications may allow for conversation and other data transfer. The second side of the smart device may access supplementary circuitry that may allow for the simultaneous using of a cell phone function on one side and a WIFI based phone on a second side.

Referring now to FIG. 12, another function of a second side of a two-sided smart phone may be to activate a much better performing "selfie" 1210 type picture taking. The rear facing phone in a smart phone is typically the much better performing camera device. A user may use this camera while simultaneously viewing the image on the second side screen to allow for a functional selfie. In some other examples, a better image may be passed onto a two-way video conference function by using the superior rear camera and displaying the other signal on the second side screen.

Referring now to FIGS. 13A and 13B, another function of the second side of a two-sided phone may be to coordinate operations of a DECT or WIFI function. This may be similar to the WIFI function as described earlier, but in some examples the second side may coordinate the ability to have a conversation with the phone using a DECT base unit 1360. Therefore, a user may have one side of their smart phone connected and displaying information from a typical cellular phone with WIFI communications capability while simultaneously having the ability to interface with a DECT service or with a WIFI base for voice communications. Thus, a user may have their cell phone functioning in general, but when they are at home or work, their second side may provide a differently routed communication channel that is enable by added circuitry placed into the smart phone so that it interfaces with the second side touch screen. A WIFI functionality may also include the ability of the phone to act as a "hot spot" rebroadcasting connectivity to other WIFI enabled devices. In some examples, the cellular enabled capability of the first phone side may provide connectivity while a function of the backside may enable WIFI connectivity in a "hot spot" mode.

Figure 14A:
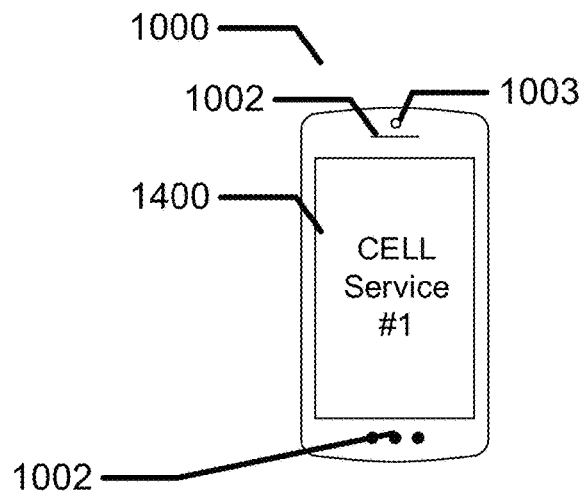
FIGS. 14A and 14B illustrate multiple cell service in the same two-sided smart phone device.
Figure 14B:
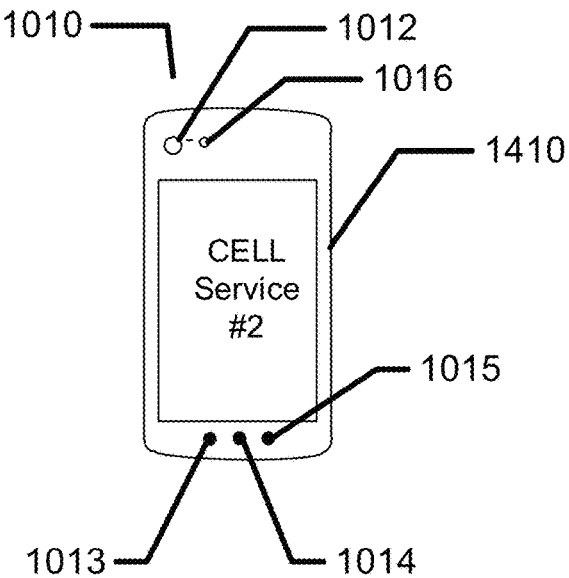

Referring to FIG. 14A and FIG. 14B, a two-sided smart phone may allow a single smart phone device to display and interact with two separate cell services. For example, the first side may interface with a first cell service 1400 and the second side with a second cell service 1410. There are numerous users that have two smart phones that they carry around with them, one for "work" and the other for "personal" communications and data. In this example, the user could carry a single smart phone device where each of the two sides could interface to a different cellular service.

Figure 15A:
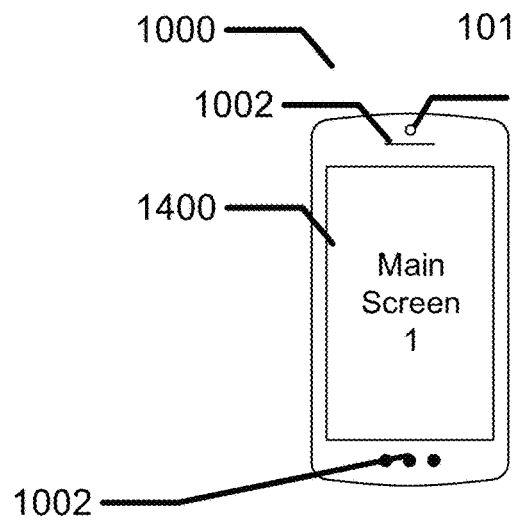
FIGS. 15A and 15B illustrate mirroring a first screen of a two-sided smart phone device on the second screen.
Figure 15B:
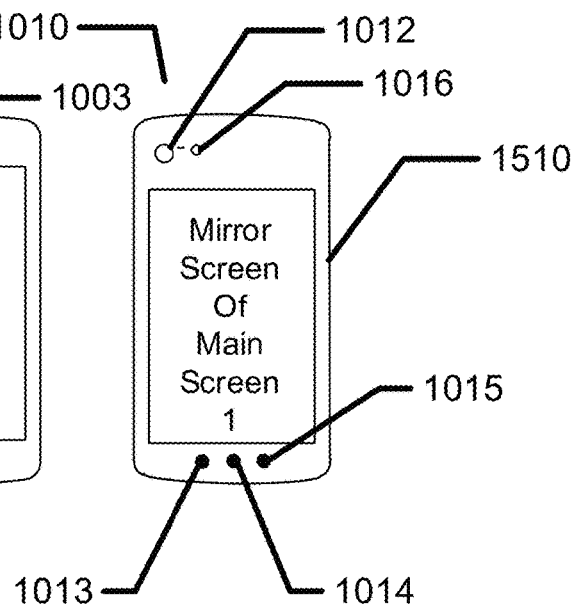

Referring to FIG. 15A and FIG. 15B another function of a two-sided smart phone may be illustrated where the second sided of the phone may be a mirror image 1510 of the first "main" screen. There may be numerous utility to having such a mirror function. In some examples, the smart device may be held between two users who may simultaneously view the same information may standing facing each other. In some other examples, a phone left down on a surface may always have a surface that may be on facing up, or may be activated with a touch.

Referring to FIGS. 16A and 16B another use of a two-sided phone is illustrated. In some examples, a user may want to have a standard smart phones functions on the first side of the phone interfaced and displayed on the main screen 1400. However, the user may also wish to select customized functions of various kinds for his smart phone which may interface with the second side. In all these examples, but particularly in this example, a standard commercially available smart phone may be retrofitted to add a second side with additional control electronics and devices for the customized functions. In some examples, there may be a second screen 1600, with some or all the functions that have been described herein previously. What the user may also specify are additional sensor functions that he wishes his phone to perform such as the first sensor 1650 and the second sensor 1660. The sensors, may sense numerous conditions. In some examples, the sensors may be more sensitive sensors that exist in standard phones like gyroscopes, light sensors, force sensors, radar and proximity sensors, sound sensors, accelerometers or there may be other sensing functions like temperature, pressure, wind speed, magnetic field and the like as non-limiting examples. The sensors may include more advanced cameras that may be sensitive at other spectral regimes or have supplementary capabilities to the rear facing camera 1012 or may have advanced functions such as Lidar. There may be chemical and biological sensors of various kinds as well for example. In some examples, carbon dioxide, carbon monoxide, propane, methane, oxygen, ozone, allergens of various types and other types of safety sensors may be incorporated. Some safety functions may include smoke sensing, radioactivity and radiation sensing and the like. Sensors may be used for automatic sensing of various kinds where the smart phone may collect the sensing information as part of its customized function and use the commercial smart phone backbone for various communication and processing.

There may be various touch sensing devices such as a first "touchlet" 1630 or a second touchlet 1640 which may be small displays with a different type of touch sensing that may be enhanced in various ways such as pressure sensitive function and the like.

In some examples, there may be various additional functions that are customized by the user. These may vary across a wide range of functions, such as enhanced display capability such as holographic display for example. There may be stereoscopic camera capabilities. There may be enhanced energy transfer functions that tie into batteries of the device. There may be other enhancements such as fuel cell incorporation. There may be numerous types of exemplary functions as illustrated by a first function 1610 and a second function 1620. The point is that a user can specify customized functions that may be developed by third parties for example and can be added to a customized phone device for a user.

Customized Production of Smart Devices, Phones and Touchscreen Devices.

Figure 17:
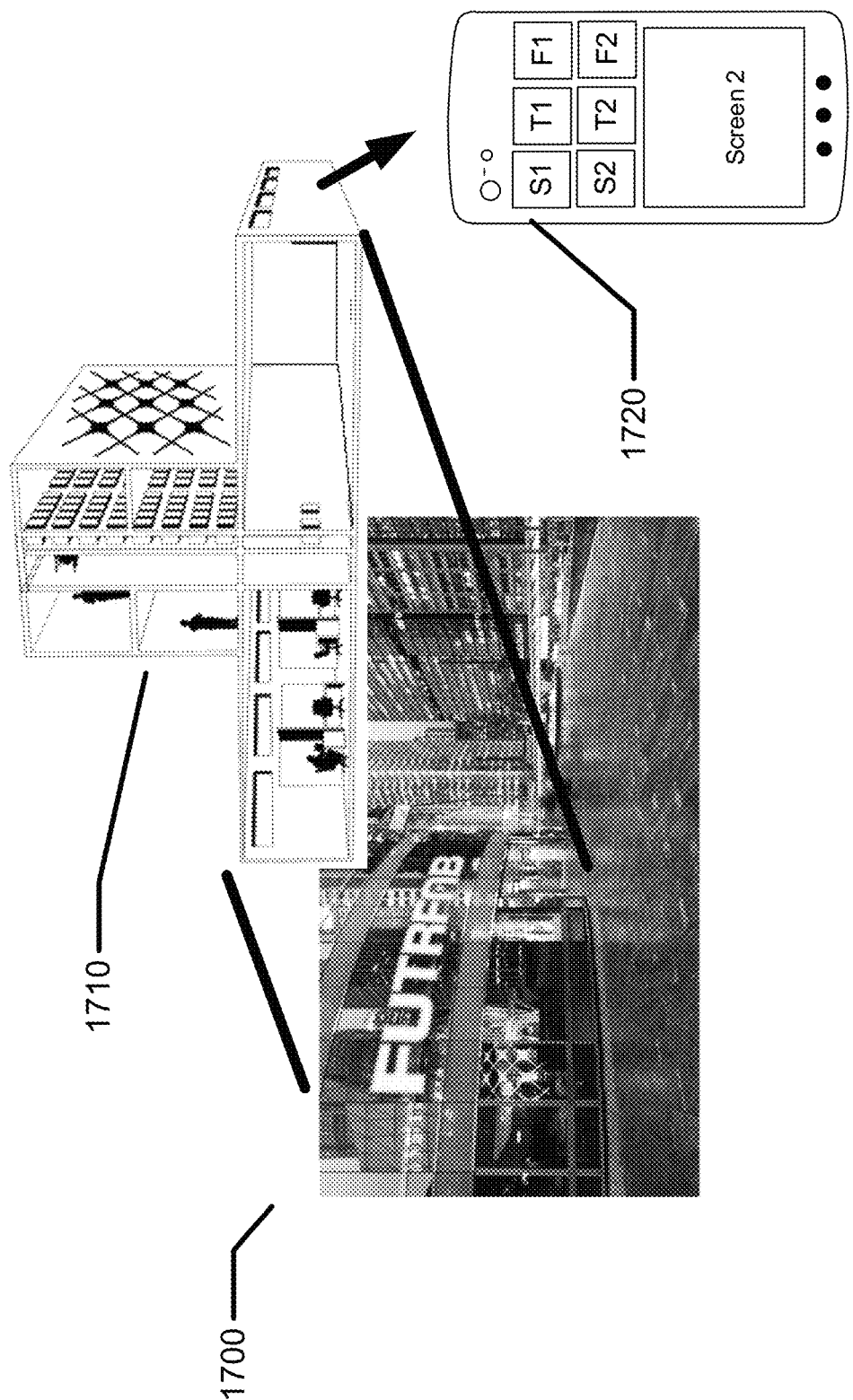
FIG. 17 illustrates novel fabrication locations and fabrication facilities to create customized smart devices and touchscreen devices.

The ability to develop and manufacture customized smart devices, phones and touchscreen devices is well supported by the cleanspace fabricator concept as has been described. Referring now to FIG. 17, an example of a cleanspace fabricator 1710 is illustrated where the fabricator may be located in a storefront 1700 based location. In some examples, the storefront may be located in an urban environment, where users of smartphones may enter the storefront and configure their customized smart phone or other smart device. In other examples, the smart devices or touch screen devices may be customized for various industrial, experimental or personal type uses. A cleanspace allow for a facility which does not demand a lot of space or utilities from a location such as electricity, heating, and air flow while providing a cleanspace for the making of sensors, circuits and for placing and connecting integrated circuits and other components. The result may be customized smart devices and customized touchscreen devices 1720.

Smart Devices, Phones and Touchscreen Devices with Hardware Encryption.

A smart device, phone or touchscreen device may be assembled or altered using a small form cleanspace fabricator with custom security features that can be made unique to the device or a collection of devices. A hardware based encryption device may be formed into a pair of devices to include enough stored data, made common between the devices to create a time changing encryption protocol. In an example, a new character may be added to an encryption code at a selected period such as every hour, or at a variable but programmed frequency common between the paired device. In some examples, a portion of the encryption coding may come from physical measurements of parameters such as a capacitance reading that comes from a device formed in encapsulation layers manufactured into the pair of devices in the cleanspace fabricator environment. For example, a random pattern of numerous electrode pads may be formed as encapsulating layers along with dielectric layers, which may be very difficult to maintain if the encapsulating layers are removed. Thus, a secure encryption code may be engaged in hardware based schemes which may not easily be detected or broken. If for example all the circuits of the phone, smart device, or other device are encapsulated with multiple layers that are precisely controlled so that a particular dielectric thickness is found at capacitors, which may be in examples be millions of devices across the encapsulating layer where only a small subset are used for the security protocol in the paired devices. In some examples, other physical measurements such as resistance, optical dielectric characters or other physical characteristics that may be formed by creating encapsulating layers. A person intent on breaking the code by physically delayering the device may not be able to get to the device without deactivating the physical measurement aspect.

In a secure cleanspace fabricator, pairs of devices or collection of devices may be made to have the same physical characteristics—to a known degree of variation for the collection of devices. Thus, encoded data may be securely written to the collection of devices to be stored in a memory device with a physical supplement to the encoding. The device could use the physical measurement for various purposes. The measurement may control timing of dynamic change of an encryption key as an example, or it may provide data values to be included in the encryption key. The physical device that may be assembled as part of the encapsulation of a hardware encryption device may also have security protocols. For example, any change in the physical measurement detected may be used to start a protocol to disable the device and perhaps initiate a self-destruction protocol which may range from the erasure of the stored data to physical destruction from electrical means or to chemical means such as initiation of a reaction of a foil of reactive metals which may create enough heat to melt portions of electrical devices to render investigation of stored data remnants difficult. In some examples, the self-destruction process may result in physical damage to the device. A change in a physical measurement may most likely be something that happens when a third party is trying to access the encryption chip. In other cases, it could come from the device being lost or damaged in use, where a disabling of the device is warranted for security purposes. The creation of customized devices with physical measurement as well as incorporation of materials and structures for self-destruction may be greatly enhanced using a cleanspace fabricator operating without human operators.

Figure 18:
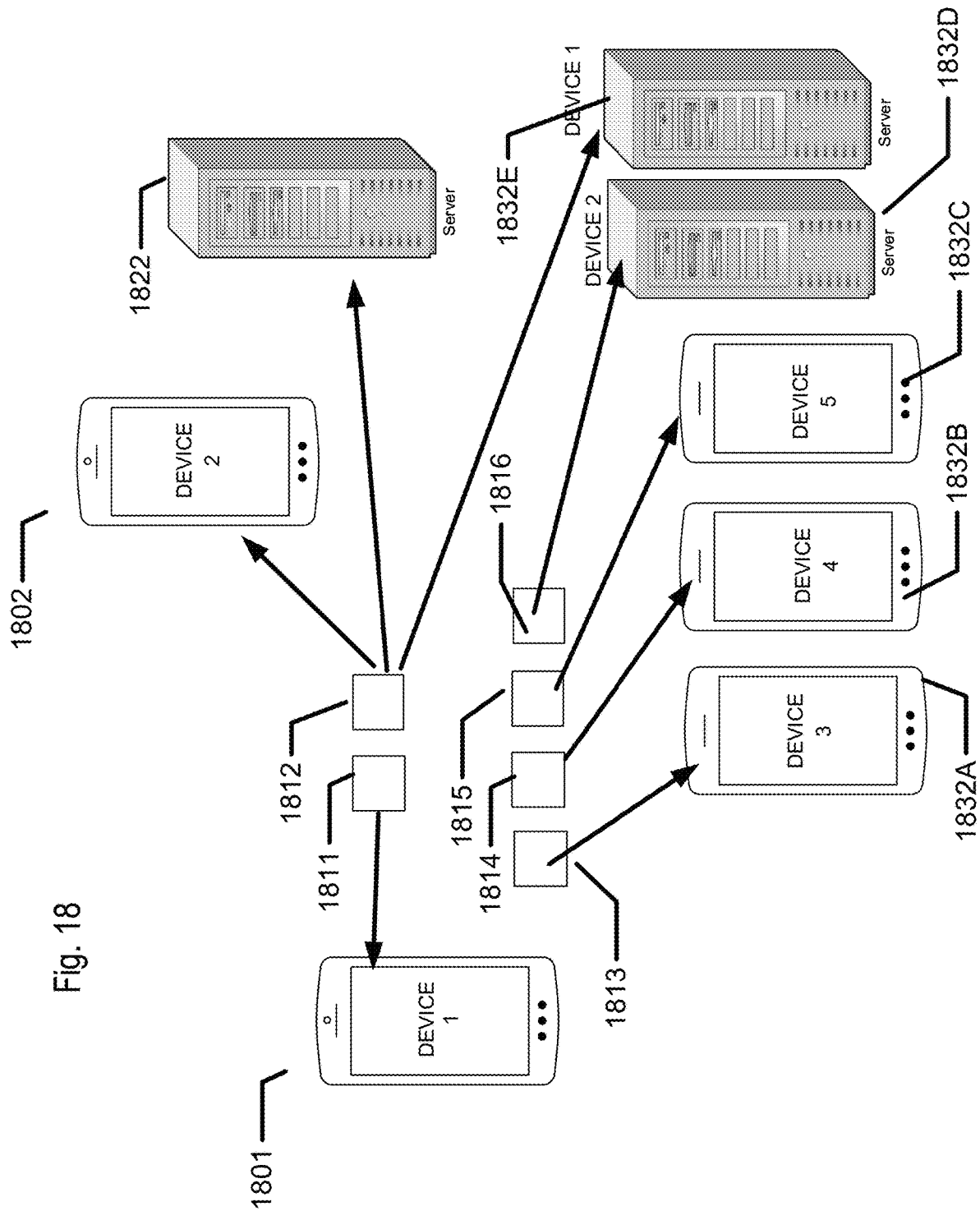
FIG. 18 illustrates an encryption scheme between paired or combination of devices.

A hardware based encryption scheme as discussed may provide security that may have advantages such as not using an external processor to perform processing related to encryption. This may result in higher speed as well as more security to the scheme. Referring to FIG. 18, an exemplary device to be produced may include a smart phone 1801. In some examples, a user may have a pair of smart phones created where any secure data sent between the phones may be securely encrypted in a customized way just between the pair of smart phones. Thus, a pair of customized encryption chips 1811 and 1812 may be placed into a pair of smart phones 1801 and 1802. These phones may be the only devices that can encrypt and decrypt data in real time, and may include a dynamic encryption key synchronized to internal, with ultraprecise microelectronic clocks, or external clock signals.

In other examples, a smart phone 1801 and a network pluggable device 1822 pair may be created where the network pluggable device may be placed in a secure network to share encrypted data. The network pluggable device may be fabricated in a very similar fashion to the second smart phone 1802 but may be made to plug into a server for example. Thus, if the server is kept in a secured location, the security of the communication is ensured by the encryption protocol between the smart phone 1801 and the network pluggable device 1822.

In some other examples a collection 1801, 1832A, 1832B, 1832C, 1832D and 1832E as a non-limiting example of more than two commonly encrypted devices may be created where the devices can share an identical encryption scheme. In the example, 6 encryption devices 1811-1816 may be assembled into smart phones 1801, 1832A, 1832B and 1832C as well as network pluggable devices 1832D and 1832E.

As mentioned earlier, devices may be formed with the ability to self-destruct in the event of tampering or breaking. The creation of such devices may involve steps that are dangerous for human operators of the assembly equipment. The cleanspace fabricator concept allows for manufacturing and assembly in facilities that do not require human operators of the equipment. An example of a self-destruction cycle that may maintain safety to an operator may include a placement of a metallic foil device made of thin alternative layers of reactive metal foils that are stable until activated such as by an electrical current. When the foils react, they may release a discrete amount of energy in a very rapid amount of time. The rapidity of the release may cause the temperature in the near region of the foil to rise to extreme temperatures such as over 400 degrees Celsius or more. This may cause integrated circuit metallurgy to melt, or may at least cause memory elements such as flash memory devices to erase any evidence of the data state they were last holding. Without stored data, the encryption device would not be able to function, and a third party trying to gain access to the prior encryption keys that were used for communication would not have a functional means to recreate the keys.

It may be possible conceptually for a third party to defeat the self-destruction protocol with sophisticated tactics, therefore, another function that assembly in a cleanspace fabricator could enable is the secure inclusion of physically measurable aspects into the encapsulation of the encryption chip type devices. Thus, for a third part to gain access to the encryption chip, they may need to remove the encapsulation layers. The design of the physical measurable devices may mean that critical information relevant to the deciphering the encryption keys may be destroyed as part of gaining access to the encryption chip.

Referring to FIG. 19 a non-limiting example of a physical measurement is illustrated. The illustrated example includes a resistive network or a resistor network that may be measured by the encryption chip or circuit for the physical measurement supplement to the encryption key. However other measurable quantities such as capacitance, optical transmittance, and the like may be used to create a physically measurable quantity that may be incorporated into an encryption protocol. An internal surface of an exemplary smart device 1901 and an encryption chip 1910 may be assembled, for example in a cleanspace fabricator, into the assembled combination device 1920. The assembled combination device may be encapsulated with a complex set of encapsulation layers that include encoded physical measurement aspects 1930. In the inset 1940 which is a blown-up example, an array of metallic squares is illustrated. The squares may have numerous connection paths into the encryption chip 1910. These metallic squares be organized into subsets such as rows or columns or may have relatively random orientations of connection which may all be defined by an under layer (not illustrated) to the connection pads. A data pad 1941 and a ground connection pad 1942 are illustrated.

The connection pads may receive, in a non-limiting example, a film of casted graphene ink which has been formed into a foil 1951. The casted graphene ink may be treated with heat cycles and the like in a remote step and may have pads of metal deposited upon the sheet for electrical contact. The pads of deposited metal may also be coated with pieces of foil comprised of multiple extremely thin layers of reactive metals and a solder coat. When the pads of deposited metal and the casted graphene ink foil are placed upon the encryption chip, an activation of the solder connections may be caused to occur with a standard protocol including either electrical, thermal, or sonic activation to join them to the underlying pads such as data pad 1941.

As illustrated in the inset 1950, the graphene foil may be attached and exposed during encapsulation of the device. The graphene foil may be processed such that it has a very high sheet resistance in the absence of a laser annealing treatment. Thus, irradiation 1954 may be selectively made incident upon regions of the graphene sheet as illustrated by the circular irradiation site 1953 over one pad connection. As well as which regions above connection pads are irradiated the process may control other parameters accurately such as the dimension of the irradiation site 1953. In the example, the irradiated sites such as irradiation site 1953 will create a variable and definable resistance path through the connection pad. In some examples, the resistance may be dynamically measured while the encoding is being performed and the laser processing may be tailored to give a select value. It may be obvious that the laser treatment of the graphene foil may not create a physical distortion of the film that may be observed on a macroscale, thus it may be invisible to a third party. In a subsequent step as shown in inset 1960, a metallic film 1961 may be deposited over the encapsulation region. The metallic film 1961 may be thick enough to obscure the presence of the contact pads thereunder and may be deposited at multiple angles to obscure relief patterns. The graphene film may be sensitive to thermal effects and therefore a cooled deposition process may be used. There may be numerous other layers such as an insulating top layer, such as of Parylene, that may be deposited upon the encapsulation to seal all the layers thereunder. Various dyes or other colorants may be added to the top layers to obscure the nature of underlying layers for added security. These steps may be performed in a customized manner in various fabrication environments but which may be even more functional in a cleanspace manufacturing environment. Customized production may result in secure, unique encrypted pairs or combinations which may be used for voice communications, video communications or other data communications between trusted parties.

Analog Inputs to Determine Encryption Codes.

In some examples, a method to determine an encryption key or a portion of an encryption key which may be encoded upon the encapsulation layers of an integrated circuit or a device itself as mentioned herein, may include an entry of a parameter by a user which is formed by an analog measurement. For example, a turnable potentiometer may have a variably set resistance which may be measured or otherwise used by a device which creates the pattern to encode upon the encapsulation layer to form the encryption code or the portion of the encryption code. In some examples, a combination, difference or other mathematical functional combination of more than one analog entry may be used to create the code.

In examples where an analog input may be used at least as part of the means of creating a user settable code, it may be important to control environmental parameters such as electrical currents, temperatures, humidity and the like of the analog settable device so that the entered analog value is stable enough to be used to create the two or more devices that will be uniquely encrypted using the user entered code. In some examples, a reading of the analog entry may be captured at a point in time, and then used to create encryption codes in two or more "paired" devices. In some other examples, it may be desirable not to have any trace of digitized stored data related to an encryption key, where such a trace could conceivably be retrieved to reconfigure an encryption code, in which case the pure analog measurement to a certain degree of stable accuracy may be used. In the other cases, it may be sufficient to ensure that the measured value of the analog input is not stored in the devices used to create the encrypted devices, and is naturally erased after a time limit, or upon some other rule generated scheme to ensure that any trace of the code used to create the encryption is eliminated. In some examples, the process of encapsulation will create an encoding of the device that cannot be retrieved by removing portions of encapsulation.

In some examples, analog codes may be generated by setting a resistance, a capacitance, an electrical potential, an electrical current, a photon source wavelength, a photo source intensity, a sound wavelength or intensity, temperature, a physical distance such as a distance between mirrors or the like.

There may be numerous models related to the types of devices into which a hardware encryption device with the various physical measurement supplementary protections may be added. As mentioned smart phones, smart devices, tablets and network pluggable devices may be included. The network pluggable device may be plugged into servers or other work stations, and in some models, may be a pair that includes one node at a telecommunications provider and the other in a smart device. Other electronic circuit boards related to data communication including mother boards of desktop computers, mainframes, telecommunications systems, modems, routers, WIFI routers may have hardware encryption devices which vary encryption over time with physical measurement supplements to create a unique pairing amongst two or more customized devices. Hereto, the physical measurements may be used for numerous encryption functions including determining the order of stored encryption keys to be used, as supplementary portions of the encryption key data and/or as input to the determination of timing cycle for the changing of encryption keys.

While the invention has been described in conjunction with specific embodiments, it is evident that many alternatives, modifications and variations will be apparent to those skilled in the art in light of the foregoing description. Accordingly, this description is intended to embrace all such alternatives, modifications and variations as fall within its spirit and scope.

What is claimed is:

1. A method of producing a customized smart device comprising:
   configuring a cleanspace fabrication system;
   installing the cleanspace fabrication system in a multi-floor storefront;
   soliciting desired customization options from a user;
   producing a case capable of holding a first touchscreen device;
   installing electronics to interface and drive the first touchscreen;

installing a baseband integrated circuit within the smart device;

installing a hardware encryption device within the smart device;

writing customized encryption codes into a memory circuit of the hardware encryption device; and encapsulating the hardware encryption device with a multilayer encapsulation stack, wherein a plurality of physically measurable devices are included in the encapsulation stack and electrically connected to the hardware encryption device, wherein removing the encapsulation stack to gain access to the hardware encryption device would alter at least a first physical measurement from the physically measurable devices, and wherein the first physical measurement is used by the hardware encryption device in determining an instant encryption code.

2. The method of claim 1 wherein an analog value entered by a user comprises at least a portion of a value used for determining an encryption code used in the creation of aspects of an encryption code of the hardware encryption integrated circuit.

3. The method of claim 2 wherein the analog value set by the user which controls processing is a resistance determined by an action of the user on a physically alterable device.

4. The method of claim 3 wherein the processing occurs without any storage of a value associated with the analog value entered by the user except for the aspects of the hardware encryption integrated circuit created through use of the analog value.

5. A method of producing a customized smart device comprising:

soliciting desired customization options from a user;

producing a case capable of holding a first touchscreen device;

installing electronics to interface and drive the first touchscreen;

installing a baseband integrated circuit within the smart device;

installing a hardware encryption device within the smart device;

writing customized encryption codes into a memory circuit of the hardware encryption device; and encapsulating the hardware encryption device with a multilayer encapsulation stack, wherein a plurality of physically measurable devices are included in the encapsulation stack and electrically connected to the hardware encryption device, wherein removing the encapsulation stack to gain access to the hardware encryption device would alter at least a first physical measurement from the physically measurable devices, and wherein the first physical measurement is used by the hardware encryption device in determining an instant encryption code.

6. The method of claim 5 wherein an analog value entered by a user comprises at least a portion of a value used for determining an encryption code used in the creation of aspects of an encryption code of the hardware encryption integrated circuit.

7. The method of claim 6 wherein the analog value set by the user which controls processing is a resistance determined by an action of the user on a physically alterable device.

8. The method of claim 7 wherein the processing occurs without any storage of a value associated with the analog value entered by the user except for the aspects of the hardware encryption integrated circuit created through use of the analog value.

* * * * *